US012434080B2

(12) United States Patent
Vasiliev et al.

(10) Patent No.: US 12,434,080 B2
(45) Date of Patent: Oct. 7, 2025

(54) FOLDABLE FACE-PIECE RESPIRATOR WITH EXHALATION VALVE

(71) Applicant: 3M INNOVATIVE PROPERTIES COMPANY, St. Paul, MN (US)

(72) Inventors: Evgeny V. Vasiliev, Volokolamsk (RU); Dean R. Duffy, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/072,815

(22) Filed: Oct. 16, 2020

(65) Prior Publication Data

US 2021/0038928 A1 Feb. 11, 2021

Related U.S. Application Data

(62) Division of application No. 15/763,633, filed as application No. PCT/US2016/054126 on Sep. 28, 2016, now abandoned.

(30) Foreign Application Priority Data

Sep. 30, 2015 (RU) ........................... RU2015141569

(51) Int. Cl.

| | |
|---|---|
| ***A62B 18/10*** | (2006.01) |
| ***A41D 13/11*** | (2006.01) |
| ***A62B 23/02*** | (2006.01) |

(52) U.S. Cl.
CPC .......... *A62B 18/10* (2013.01); *A41D 13/1115* (2013.01); *A62B 23/025* (2013.01)

(58) Field of Classification Search
CPC ...... A62B 23/00–025; A62B 18/00–10; A62B 18/02; A62B 18/08; A62B 23/025; A62B 7/00; A62B 7/10; A62B 9/00; A62B 9/02–027; A62B 18/025; A62B 18/10; A41D 13/1115; A41D 13/1107;
(Continued)

(56) References Cited

U.S. PATENT DOCUMENTS

| | | | |
|---|---|---|---|
| 3,971,373 | A | 7/1976 | Braun |
| 4,013,816 | A | 3/1977 | Sabee |

(Continued)

FOREIGN PATENT DOCUMENTS

| | | |
|---|---|---|
| CA | 1296487 | 3/1992 |
| CA | 0108341 | 2/2006 |

(Continued)

OTHER PUBLICATIONS

Hao. CN-204191652-U. Machine translation from Espace.net. Retrieved on Mar. 21, 2022. (Year: 2015).*

(Continued)

*Primary Examiner* — Michelle J Lee

(57) ABSTRACT

A foldable filtering face-piece respirator is disclosed. The respirator includes a mask body having a line of demarcation that separates the mask body into a first portion and a second portion. The respirator also includes an exhalation valve positioned on the line of demarcation and in a central area of the mask body such that the exhalation valve is positioned essentially over a wearer's mouth during use. The line of demarcation is discontinuous at the location of the valve.

20 Claims, 10 Drawing Sheets

(58) Field of Classification Search
CPC .............. A41D 13/1123; A41D 13/113; A41D 13/1138; A41D 13/1161; A41D 13/1176; A41D 13/1184; A41D 13/11–1192; A41D 2400/42; A61M 16/0683; A61M 16/0605; A61M 2210/0618; A61M 2210/062; A61M 16/06–0694
See application file for complete search history.

(56) References Cited

U.S. PATENT DOCUMENTS

| | | | | |
|---|---|---|---|---|
| 4,215,682 | A | 8/1980 | Kubik | |
| 4,300,549 | A | 11/1981 | Parker | |
| 4,536,440 | A | 8/1985 | Berg | |
| 4,588,537 | A | 5/1986 | Klasse | |
| 4,600,002 | A | 7/1986 | Maryyanek | |
| D285,374 | S | 8/1986 | Huber | |
| 4,606,341 | A | 8/1986 | Hubbard | |
| 4,688,566 | A | 8/1987 | Boyce | |
| D294,410 | S | 2/1988 | Montesi | |
| 4,790,306 | A | 12/1988 | Braun | |
| 4,798,850 | A | 1/1989 | Brown | |
| 4,807,619 | A | 2/1989 | Dyrud | |
| 4,850,347 | A | 7/1989 | Skov | |
| 5,237,986 | A | 8/1993 | Seppala | |
| 5,325,892 | A | 7/1994 | Japuntich | |
| 5,496,507 | A | 3/1996 | Angadjivand | |
| 5,509,436 | A | 4/1996 | Japuntich | |
| 5,558,089 | A | 9/1996 | Castiglione | |
| 5,617,849 | A | 4/1997 | Springett | |
| D382,341 | S | 8/1997 | Freund | |
| 5,656,368 | A | 8/1997 | Braun | |
| 5,687,767 | A | 11/1997 | Bowers | |
| D388,872 | S | 1/1998 | Grannis | |
| D389,239 | S | 1/1998 | Scholey | |
| 5,804,295 | A | 9/1998 | Braun | |
| D409,744 | S | 5/1999 | Grannis | |
| 5,908,598 | A | 6/1999 | Rousseau | |
| D412,573 | S | 8/1999 | Castiglione | |
| D421,118 | S | 2/2000 | Reischel | |
| 6,041,782 | A | 3/2000 | Angadjivand | |
| 6,062,221 | A | 5/2000 | Brostrom | |
| D426,298 | S | 6/2000 | Grannis | |
| 6,123,077 | A | 9/2000 | Bostock | |
| D431,647 | S | 10/2000 | Henderson | |
| 6,125,849 | A | 10/2000 | Williams | |
| 6,332,465 | B1 | 12/2001 | Xue | |
| 6,334,671 | B1 | 1/2002 | Umehara | |
| 6,336,459 | B1 | 1/2002 | Miyake | |
| 6,375,886 | B1 | 4/2002 | Angadjivand | |
| 6,391,429 | B1 | 5/2002 | Senkus | |
| 6,394,090 | B1 | 5/2002 | Chen | |
| 6,397,458 | B1 | 6/2002 | Jones | |
| 6,398,847 | B1 | 6/2002 | Jones | |
| 6,406,657 | B1 | 6/2002 | Eitzman | |
| 6,409,806 | B1 | 6/2002 | Jones | |
| 6,454,986 | B1 | 9/2002 | Eitzman | |
| 6,484,722 | B2 | 11/2002 | Bostock | |
| 6,492,286 | B1 | 12/2002 | Berrigan | |
| RE37,974 | E | 2/2003 | Bowers | |
| D473,937 | S | 4/2003 | Fecteau | |
| 6,568,392 | B1 | 5/2003 | Bostock | |
| 6,743,464 | B1 | 6/2004 | Insley | |
| 6,783,574 | B1 | 8/2004 | Angadjivand | |
| 6,824,718 | B2 | 11/2004 | Eitzman | |
| 6,843,248 | B2 | 1/2005 | Japuntich | |
| 6,854,463 | B2 | 2/2005 | Japuntich | |
| 6,883,518 | B2 | 4/2005 | Mittelstadt | |
| 6,923,182 | B2 | 8/2005 | Angadjivand | |
| 7,013,895 | B2 | 3/2006 | Martin | |
| 7,028,689 | B2 | 4/2006 | Martin | |
| 7,036,507 | B2 | 5/2006 | Jensen | |
| 7,117,868 | B1 | 10/2006 | Japuntich | |
| 7,131,442 | B1 | 11/2006 | Kronzer | |
| RE39,493 | E | 2/2007 | Yuschak | |
| 7,188,622 | B2 | 3/2007 | Martin | |
| 7,311,104 | B2 | 12/2007 | Japuntich | |
| D567,366 | S | 4/2008 | Betz | |
| D568,986 | S | 5/2008 | Holmquist-Brown | |
| D574,486 | S | 8/2008 | Betz | |
| D575,390 | S | 8/2008 | Scott | |
| 7,428,903 | B1 | 9/2008 | Japuntich | |
| D589,607 | S | 3/2009 | Ungar | |
| D597,200 | S | 7/2009 | Grimsley | |
| D613,850 | S | 4/2010 | Holmquist-Brown | |
| 7,697,812 | B2 | 4/2010 | Parikh | |
| D645,956 | S | 9/2011 | Grimsley | |
| 8,439,038 | B2 | 5/2013 | Steindorf | |
| 9,012,013 | B2 | 4/2015 | Duffy | |
| 2007/0251522 | A1 | 11/2007 | Welchel | |
| 2009/0078264 | A1* | 3/2009 | Martin | A62B 23/025 128/206.17 |
| 2009/0283096 | A1 | 11/2009 | Cerbini | |
| 2010/0154805 | A1 | 6/2010 | Duffy | |
| 2010/0269831 | A1 | 10/2010 | Skov | |
| 2011/0057700 | A1 | 3/2011 | Spoo | |
| 2011/0067700 | A1* | 3/2011 | Spoo | A62B 23/025 128/206.19 |
| 2011/0094515 | A1* | 4/2011 | Duffy | A41D 13/1138 128/206.19 |
| 2012/0125341 | A1* | 5/2012 | Gebrewold | A41D 13/1146 264/249 |
| 2012/0125342 | A1 | 5/2012 | Gebrewold | |
| 2016/0045772 | A1 | 2/2016 | Martin | |
| 2016/0129287 | A1* | 5/2016 | Danford | A62B 23/025 128/863 |
| 2018/0280738 | A1 | 10/2018 | Gabriel | |

FOREIGN PATENT DOCUMENTS

| | | | | |
|---|---|---|---|---|
| CN | 3511670 | | | 3/2006 |
| CN | 203897347 | | | 10/2014 |
| CN | 204191652 | | | 3/2015 |
| CN | 204191652 | U | * | 3/2015 |
| EP | 0894443 | | | 3/2003 |
| EP | 1495785 | | | 1/2005 |
| EP | 2298419 | | | 3/2011 |
| GB | 2063656 | | | 6/1997 |
| GB | 2080384 | | | 4/1999 |
| GB | 3003465 | | | 6/2002 |
| JP | 6384253 | | | 6/1988 |
| JP | 03173580 | A | | 7/1991 |
| JP | 2010187901 | B2 | | 9/2013 |
| KR | 101013242 | B1 | * | 2/2011 |
| RU | 00037855 | | | 12/1993 |
| RU | 2118902 | | | 9/1998 |
| RU | 00050739 | | | 7/2002 |
| RU | 00073548 | | | 12/2009 |
| RU | 00076789 | | | 11/2010 |
| RU | 00077407 | | | 1/2011 |
| RU | 00077408 | | | 1/2011 |
| RU | 00086788 | | | 10/2013 |
| RU | 151559 | | | 4/2015 |
| RU | 100310 | | | 10/2016 |
| WO | WO 1996-028216 | | | 9/1996 |
| WO | WO 1999-024119 | | | 5/1999 |
| WO | WO 2000-048481 | | | 8/2000 |
| WO | WO 2009-038904 | | | 3/2009 |
| WO | WO 2009-038917 | | | 3/2009 |
| WO | WO 2009-038934 | | | 3/2009 |
| WO | WO 2010-080201 | | | 7/2010 |
| WO | 2011163002 | A2 | | 12/2011 |
| WO | WO 2016-181144 | | | 11/2016 |
| WO | WO 2017-058880 | | | 4/2017 |

OTHER PUBLICATIONS

Hao et al., “A kind of electret air particle protective mask with one-way breather valve”, Mar. 11, 2015, all pages (Year: 2015).*

Davies, “The Separation of Airborne Dust Particles”, Institution of Mechanical Engineers, London, Proceedings (B) vol. 1B, Nos. 1-12, 1952, pp. 185-198.

(56) References Cited

OTHER PUBLICATIONS

International Search Report for PCT International Application No. PCT/US2016/054126, mailed on Jan. 2, 2017, 4 pages.

* cited by examiner

FOLDABLE FACE-PIECE RESPIRATOR WITH EXHALATION VALVE

CROSS-REFERENCE TO RELATED APPLICATION

This application is a divisional application of U.S. application Ser. No. 15/763,633, filed Mar. 27, 2018, which is a national stage filing under 35 U.S.C. 371 of PCT/US2016/054126 filed Sep. 28, 2016, which claims the benefit of Russian Application No. 2015141569, filed Sep. 30, 2015, the disclosure of which is incorporated by reference in its/their entirety herein.

FIELD

The present disclosure pertains to a foldable filtering face-piece respirator containing an exhalation valve.

BACKGROUND

Respirators are commonly worn over the breathing passages of a person for at least one of two common purposes: (1) to prevent impurities or contaminants from entering the wearer's breathing track; and (2) to protect other persons or things from being exposed to pathogens and other contaminants exhaled by the wearer. In the first situation, the respirator is worn in an environment where the air contains particles that are harmful to the wearer, for example, in an auto body shop. In the second situation, the respirator is worn in an environment where there is risk of contamination to other persons or things, for example, in an operating room or a clean room.

A variety of respirators have been designed to meet either (or both) of these purposes. Some respirators have been categorized as being "filtering face-pieces" because the mask body itself functions as the filtering mechanism. Unlike respirators that use rubber or elastomeric mask bodies in conjunction with attachable filter cartridges (see, e.g., U.S. Patent RE39,493 to Yuschak et al.) or insert-molded filter elements (see, e.g., U.S. Pat. No. 4,790,306 to Braun), filtering face-piece respirators are designed to have the filter media cover much of the whole mask body so that there is no need for installing or replacing a filter cartridge. Filtering face-piece respirators commonly come in one of two configurations: molded respirators and flat-fold respirators.

Molded filtering face-piece respirators have regularly included non-woven webs of thermally-bonded fibers or open-work plastic meshes to furnish the mask body with its cup-shaped configuration. Molded respirators tend to maintain the same shape during both use and storage. Examples of patents that disclose molded, filtering, face-piece respirators include U.S. Pat. No. 7,131,442 to Kronzer et al., U.S. Pat. Nos. 6,923,182, 6,041,782 to Angadjivand et al., U.S. Pat. No. 4,850,347 to Skov, U.S. Pat. No. 4,807,619 to Dyrud et al., U.S. Pat. No. 4,536,440 to Berg, and Des. 285,374 to Huber et al.

Flat-fold respirators can be folded into a more compact form for shipping and storage and into a cup-shaped form during use as respirator. Examples of flat-fold respirators are shown in U.S. Pat. Nos. 6,568,392 and 6,484,722 to Bostock et al., in U.S. Pat. No. 6,394,090 to Chen, EP 2 298 419 to Spoo et al. The body of such masks typically contains several panels, typically a central panel, an upper and a lower penal. Upper and lower panels are joined to the central portion by a fold line and can be folded into the central panel for storage. Other types of flat-fold respirators contain a central panel that is foldable.

During use, filtering face-piece respirators should maintain their intended cup-shaped configurations. After being worn numerous times and being subjected to high quantities of moisture from a wearer's exhalations, in conjunction with having the mask bump into other objects while being worn on a person's face, known masks can be susceptible to collapsing or having an indentation pressed into the shell. The wearer can remove this indentation by displacing the mask from her face and pressing on the indentation from the mask interior. However, the need to displace the mask from the face to remove the indentation is undesired and may also pose a health risk.

To improve the exhausting of warm, moist exhaled air from the interior space of the face masks, manufacturers often install an exhalation valve. Exhalation valves are unidirectional valves. They allow the warm, moist exhaled air to be rapidly purged from the mask interior but are in a closed position when the wearer breathes in.

However, adding an exhalation valve to flat-fold respirators may further increase the structural instability and makes the respirators more susceptible to collapsing, in particular when the valve is positioned directly or in proximity to the wearer's mouth during use. Therefore, there is a need to provide flat-fold respirators with good comfort to the wearer and that reduce breathing resistance. Favorably, such a mask has an acceptable or even improved collapse resistance while providing an improved comfort to the wearer.

SUMMARY

In the following there is provided a foldable filtering face-piece respirator that includes a mask body having a line of demarcation separating the mask body into two essentially equal portions, the respirator further having an exhalation valve positioned on the line of demarcation and in a central position of the mask body such that the exhalation valve is positioned essentially over the wearer's mouth during use and wherein the line of demarcation is discontinuous at the position of the valve.

In another aspect there is provided a method of producing a foldable face-filtering respirator comprising (a) providing a foldable filtering face-piece respirator that includes a mask body having a line of demarcation separating the mask body into two essentially equal parts, (b) creating an aperture for placing an exhalation valve through the line of demarcation at the central position of the mask body such that an exhalation valve will be positioned essentially over the wearer's mouth during use (c) attaching the exhalation valve on the mask body.

In another aspect, the present disclosure provides a foldable filtering face-piece respirator that includes a mask body including a first portion and second portion separated by a line of demarcation, where the line of demarcation includes a mask body fold line; and a harness connected to the mask body. The respirator further includes an exhalation valve disposed on the line of demarcation and in a central region of the mask body, where the exhalation valve includes a base and a cover attached to the base; and a support element connected to the base of the exhalation valve and extending from a perimeter of the base, where the support element is in contact with the mask body when the mask body is in a cup-shaped configuration.

In another aspect, the present disclosure provides a method of making a filtering face-piece respirator that includes forming a mask body; and forming a mask body fold line in the mask body that separates the mask body into a first portion and a second portion, where the first and second portions are adapted to rotate about the mask body fold line. The method further includes connecting an exhalation valve to a central region of the mask body over the body fold line such that a support element that is connected to a base of the exhalation valve and extends from a perimeter of the base and is in contact with the mask body.

The respirators according to the present disclosure provide greater comfort to the wearer compared to identical respirators with positions of the valve above or below the line of demarcation. The respirators provide lower breathing resistance compared to identical respirators without valves. The respirators may also provide increased or at least similar collapse resistance. Another advantage of the present respirator is that is it can be easier and faster to unfold into its cup-shaped form, in particular under conditions of poor visibility because the valve is positioned on a demarcation line along which at least parts of the two portions of the mask body unfold into a cup-shaped form. The centrally arranged valve on the line of demarcation may also help to keep the respirator in its cup-shaped form once it has been unfolded.

Glossary

The terms set forth below will have the meanings as defined:

"comprises (or comprising)" means its definition as is standard in patent terminology, being an open-ended term that is generally synonymous with "includes", "having", or "containing". Although "comprises", "includes", "having", and "containing" and variations thereof are commonly-used, open-ended terms, this invention also may be suitably described using narrower terms such as "consists essentially of", which is a semi open-ended term in that it excludes only those things or elements that would have a deleterious effect on the performance of the inventive respirator in serving its intended function;

"central region" means a region of a mask body of a respirator that is located in front of where the wearer's mouth when the mask is being worn;

"contaminants" means particles (including dusts, mists, and fumes) and/or other substances that generally may not be considered to be particles (e.g., organic vapors, et cetera) but which may be suspended in air;

"crosswise dimension" is the dimension that extends laterally across the respirator from side-to-side when the respirator is viewed from the front;

"cup-shaped configuration" means any vessel-type shape that is capable of adequately covering the nose and mouth of a person;

"exterior gas space" means the ambient atmospheric gas space into which exhaled gas enters after passing through and beyond the mask body and/or exhalation valve;

"filtered air" means a volume of atmospheric ambient air that has been filtered or cleansed to remove or reduce contaminants;

"filtering face-piece" means that the mask body itself is designed to filter air that passes through it; there are no separately identifiable filter cartridges or insert-molded filter elements attached to or molded into the mask body to achieve this purpose;

"filter" or "filtration layer" means one or more layers of air-permeable material, which layer(s) is adapted for the primary purpose of removing contaminants (such as particles) from an air stream that passes through it;

"filter media" means an air-permeable structure that is designed to remove contaminants from air that passes through it;

"filtering structure" means a construction that includes a filter media or a filtration layer;

"first side" means an area of the mask body that is located on one side of a plane that bisects the mask body normal to the cross-wise dimension;

"fitment" means any one or combination of donning, doffing, or the adjusting mask body;

"flange" means a protruding part that has sufficient surface area to be grasped by a person;

"frontally" means extending away from the mask body perimeter when the mask body is in a folded condition;

"harness" means a structure or combination of parts that assists in supporting the mask body on a wearer's face;

"indicia" means an identifying mark(s), pattern(s), image(s), opening(s), or combination thereof;

"integral" means being manufactured together at the same time; that is, being made together as one part and not two separately manufactured parts that are subsequently joined together;

"interior gas space" means the space between a mask body and a person's face;

"laterally" means extending away from a plane that bisects the mask body normal to the cross-wise dimension when the mask body is in a folded condition;

"line of demarcation" means a fold, seam, weld line, bond line, stitch line, hinge line, and/or any combination thereof;

"longitudinal axis" means a line that bisects the mask body normal to the cross-wise dimension;

"mask body" means an air-permeable structure that is designed to fit over the nose and mouth of a person and that helps define an interior gas space separated from an exterior gas space (including the seams and bonds that join layers and parts thereof together);

"nose clip" means a mechanical device (other than a nose foam), which device is adapted for use on a mask body to improve the seal at least around a wearer's nose;

"perimeter" means the outer edge of the mask body, which outer edge would be disposed generally proximate to a wearer's face when the respirator is being donned by a person;

"pleat" means a portion that is designed to be or is folded back upon itself;

"polymeric" and "plastic" each mean a material that mainly includes one or more polymers and that may contain other ingredients as well;

"plurality" means two or more;

"preferred" and "preferably" refer to embodiments of the disclosure that may afford certain benefits, under certain circumstances; however, other embodiments may also be preferred, under the same or other circumstances. Furthermore, the recitation of one or more preferred embodiments does not imply that other embodiments are not useful, and is not intended to exclude other embodiments from the scope of the disclosure;

"respirator" means an air filtration device that is worn by a person to provide the wearer with filtered air to breathe;

"second side" means an area of the mask body that is located on one side of a plane that bisects the mask body normal to the cross-wise dimension (the second side being opposite the first side);

"snug fit" or "fit snugly" means that an essentially air-tight (or substantially leak-free) fit is provided (between the mask body and the wearer's face);

"tab" means a part that exhibits sufficient surface area for attachment of another component; and "transversely extending" means extending generally in the crosswise dimension.

DETAILED DESCRIPTION

Figure 1:
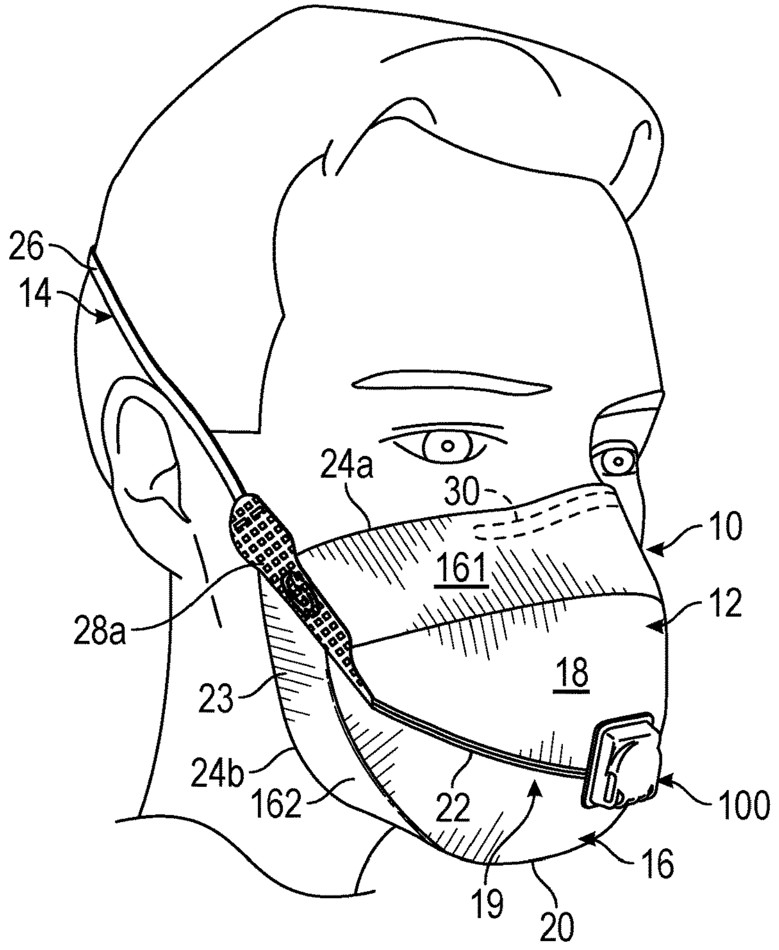
FIG. 1 is a perspective schematic view of a foldable filtering face-piece respirator 10 in accordance with the present disclosure.

The present disclosure provides various embodiments of a foldable filtering face-piece respirator construction. The respirator can be folded into a cup-shaped form for use and in a more compact form for storage or transportation. The respirator includes a mask body. The mask body contains a line of demarcation which separates the mask body into two essentially equal portions. This means the portions may be of equal size and the line of demarcation bisects the mask body or the portions may be of similar size where one portion may have up to twice the size of the other portion, or where one portion has up to and including 1.5 times the size of the other portion, or up to and including 1.1 times the size of the other portion.

The line of demarcation may be a fold, a seam, or a weld line and may support collapse resistance of the mask body. In one or more embodiments, the line of demarcation allows at least parts of the two portions of the mask body to be folded along the line of demarcation. In one particular embodiment the line of demarcation is a fold.

An exhalation valve is placed in a central area of the mask body when viewed from the front such that the exhalation valve is positioned essentially over the wearer's mouth when being donned. Positioned essentially over the wearer's mouth as used herein means it is positioned over the wearer's mouth or in proximity to the wearer's mouth, meaning in the area between the wearer's nose and chin when the respirator is being donned. Moreover, the valve is placed on the line of demarcation. The line of demarcation is discontinuous. It is interrupted at the location of the exhalation valve to allow the valve to function as an exhalation valve.

The mask body of the present disclosure may further include a first and a second additional panel joined to the mask body by a foldable connection, for example, a pleat or a fold line. In this case the mask body forms the central panel and contains the line of demarcation on which the exhalation valve is positioned.

The line of demarcation may extend transversely and separates the mask body into upper and a lower portions. Such a mask body may further include an upper additional panel joined to the upper portion of the mask body by a foldable connection, for example, a pleat or a fold line such that the additional panel can be folded into at least a part of the upper portion of the mask body. Such a mask body may also or in addition contain an additional lower panel joined to the lower portion of the mask body by a foldable connection, for example, a pleat or a fold line such that it can be folded into at least parts of the lower portion of the mask body.

At least one of the two portions of the mask body may contain one or more structural lines. Such structural lines provide additional stability to the mask body. Such lines include weld lines and seams. Weld lines typically compress the fibers in the filtering structure such that they become mostly solidified into a nonporous solid-type bond. The structural lines may be about 1 to 7 mm thick, more commonly about 4 to 5 mm thick. If the filtering structure includes one or more layers, these layers essentially become merged together at the base of the weld line.

The structural line or a plurality thereof may run in a parallel, diagonal, or orthogonal direction with respect to the line of demarcation. In a preferred embodiment, structural lines are arranged to form a structural pattern, preferably, in proximity to the exhalation valve or connected to the exhalation valve. Preferably both portions of the mask body contain a structural pattern. The valve may be located within a structural pattern or between several structural patterns, preferably connecting these patterns. In a preferred embodiment, both portions of the mask body contain several structural patterns, and the exhalation valve is placed at a conjunction of two or more structural patterns.

In another embodiment, the respirator according to the present disclosure does not contain any structural patterns because the line of demarcation provides sufficient structural stability, or the line of demarcation and one or two or more additional lines provide sufficient structural stability. Such lines may be arranged in parallel to each other or not parallel to each other.

The respirators according to the present disclosure may provide greater comfort to the wearer compared to identical respirators with positions of the valve above or below the line of demarcation. The respirators provide lower breathing resistance compared to identical respirators without valves. The respirators may also provide increased or at least similar collapse resistance but increased comfort to the wearer compared to the same respirators with exhalation valves positioned above or below the line of demarcation. Another advantage of the present respirator is that it can be easier and faster to unfold the mask body into its cup-shaped form, in particular under conditions of poor visibility because the valve is positioned on a demarcation line along which at least parts of the two portions of the mask body that unfold into a cup-shaped form. By grasping the valve, which is usually the most prominent feature of the respirator and, therefore, easy to find, and grasping at least the two portions, the respirator can be unfolded. The centrally arranged valve on the line of demarcation may also help to keep the respirator in its cup-shaped form once it has been unfolded.

Further, there may be less need for additional layers or heavier layers to provide collapse resistant qualities. The use of additional layers can result in increased breathing resistance and product cost. The present disclosure therefore presents the benefit of preserving the intended in-use shape of the mask body in conjunction with improving wearer comfort without the added cost of additional or heavier layers.

The disclosure will now be described in greater detail by referring to the drawings without intending to limit the disclosure to the drawings and combinations of features shown in the drawings. Not all features or combinations of features shown in the drawings are necessarily essential features to practice the disclosure.

FIG. 1 illustrates an example of a foldable filtering face-piece respirator 10 in an opened condition on a wearer's face. The respirator 10 may be used in accordance with the present disclosure to provide filtered air for the wearer to breathe. As illustrated, the filtering face-piece respirator 10 includes a mask body 12 and an optional harness 14. The harness 14 has a strap 26 that is attached (here: stapled) to a flange 28*a*. The flanges may be as described, for example, in PCT Patent Application No. WO2010/080201.

The mask body 12 has a filtering structure 16 through which inhaled air must pass before entering the wearer's respiratory system. The filtering structure 16 removes contaminants from the ambient environment so that the wearer breathes filtered air. The mask body 12 includes a line of demarcation 22 separating the mask body into a first portion 18 (here illustrated as top portion) and a second portion 20 (here illustrated as bottom portion). The line of demarcation 22 illustrated in FIG. 1 extends transversely across a central area 19 of the mask body 12. An exhalation valve 100 is placed in the central area 19 of the mask body 12 on the line of demarcation 22. The line of demarcation 22 is interrupted at the location of the valve 100 or sufficiently discontinued such that air can pass from the interior gas space through the valve to the exterior. The mask body 12 also includes a perimeter 23 that includes an upper segment 24*a* and a lower segment 24*b*.

An optional nose clip 30 may be placed on the mask body 12, for example, on the first portion 18 of the mask body 12 on its outer surface or beneath a cover web. The first portion 18 of the mask body 12 and/or the second portion 20 may be connected to an additional upper panel 161 and an additional lower panel 162 respectively, which are an upper and a lower panel in the embodiment illustrated in FIG. 1. The upper and lower panels 161, 162 may be connected to the central panel (made up of lower and upper portions 18, 20) of the mask body in a foldable manner. Alternatively or in addition, pleats may be connected to the first and second portions 18, 20 of the mask body or to the upper and lower additional panels 161, 162.

The lower portion 20 of the mask body 12 may include more filter media surface area than the upper portion 18. The mask body 12 may also include a perimeter web (not shown) that is secured to the mask body along its perimeter 23. The perimeter web may be folded over the mask body at the perimeter 23. The perimeter web also may be an extension of an inner cover web 58 (FIG. 5) folded and secured around the edge of the perimeter 23. The nose clip 30 may be disposed on the upper portion 18 of the mask body centrally adjacent to the upper segment 24*a* between the filtering structure 16 and the perimeter web 54. The nose clip 30 may be made from a pliable dead soft metal or plastic that is capable of being manually adapted by the wearer to fit the contour of the wearer's nose. The nose clip 30 may be made from aluminum and may be linear or it may take on other shapes when viewed from the top such as the m-shaped nose clip shown in U.S. Pat. No. 5,558,089 and Des. 412,573 to Castiglione.

Figure 2:
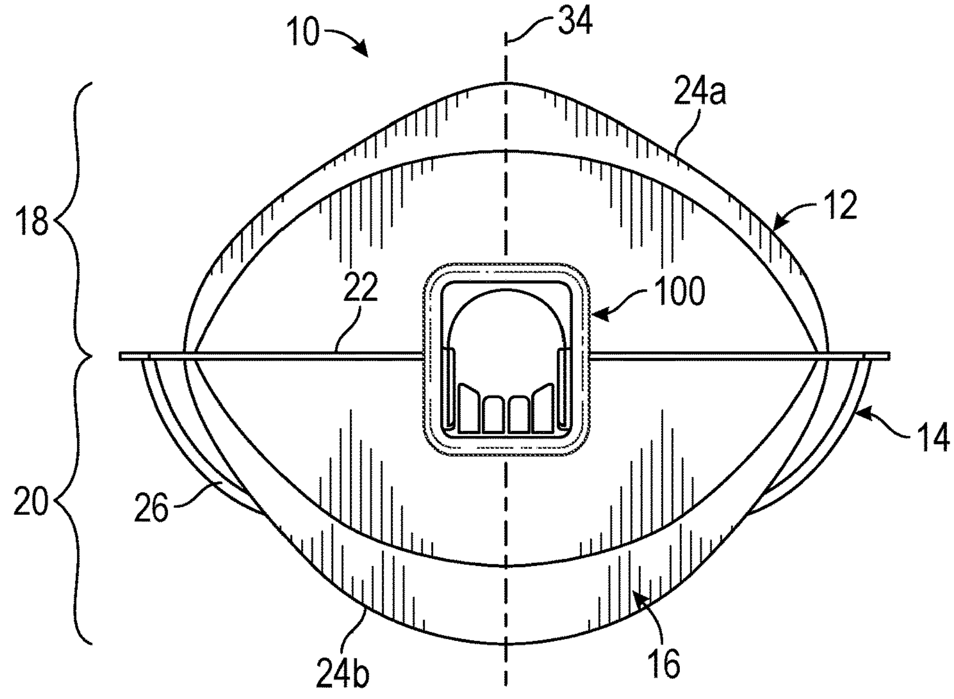
FIG. 2 is a schematic front view of the respirator 10 shown in FIG. 1.
Figure 3:
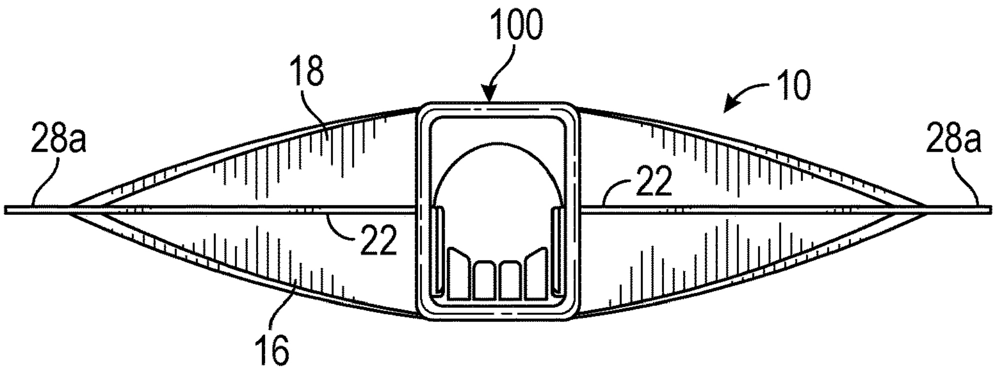
FIG. 3 is a schematic front view of the face-piece respirator 10 of FIG. 1 in a folded condition.

FIG. 2 shows the respirator 10 of FIG. 1 from the front and FIG. 3 illustrates the respirator in its collapsed or folded condition, which condition is particularly beneficial for shipping and off-the-face storage.

Figure 4:
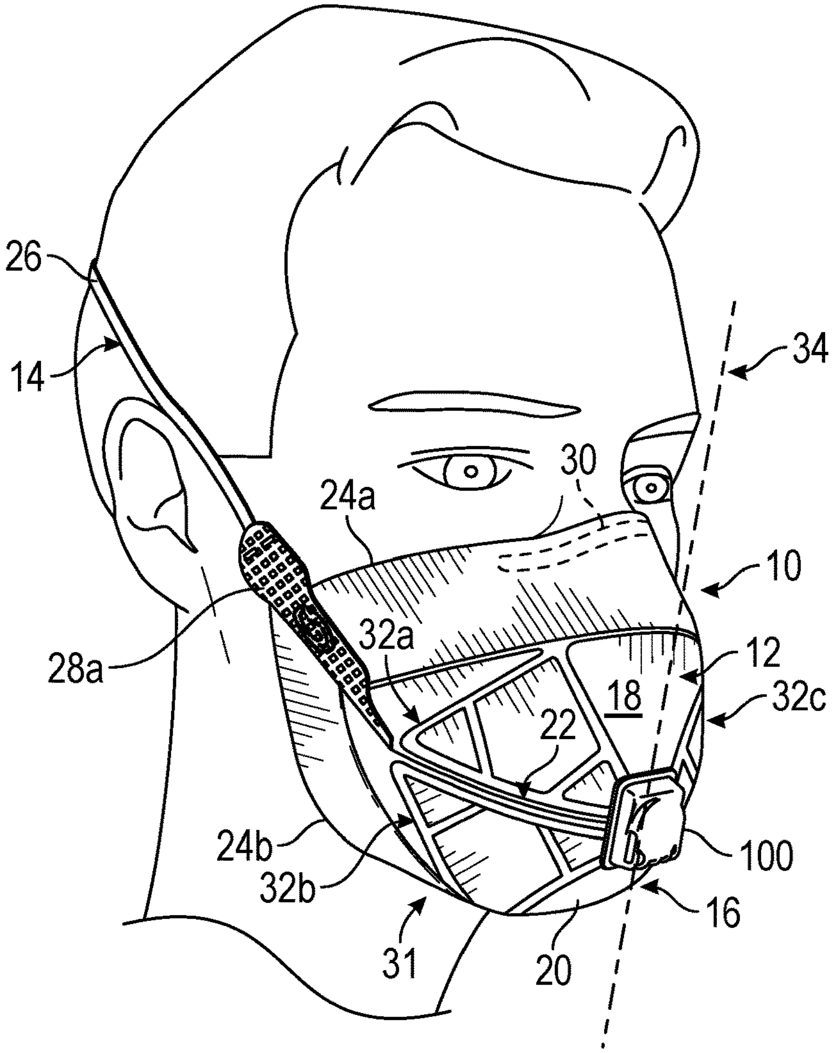
FIG. 4 is a schematic perspective view of a foldable filtering face-piece respirator 10 that contains structural patterns.

FIG. 4 illustrates an embodiment of the present disclosure showing a respirator 10 as shown in FIG. 1 with the mask body additionally having a structural pattern 31. The structural pattern 31 may be made up of lines, for example seams, or weld lines. Typically, the lines are 1 to 7 mm thick, more commonly about 4 to 5 mm thick. Preferably, the structural pattern 31 is a weld pattern. The structural pattern 31 illustrated in FIG. 4 is made up by a set of lines forming triangles. Preferably, the structural pattern does not traverse the line of demarcation 22. The structural pattern 31 illustrated in FIG. 4 includes first and second structural patterns 32*a*, 32*c*, preferably weld patterns, disposed in the first portion 18 of the mask body and not traversing the line of demarcation 22. It contains the first and second weld patterns 32*a*, 32*c* on each side of the longitudinal axis 34. The mask body 12 illustrated in FIG. 4 also has a third and fourth structural pattern 32*b* and 32*d* in the lower portion 20 of the mask body 12 and on each side of the longitudinal axis 34. The third and fourth weld patterns 32*b* and 32*d* are disposed below and not crossing the line of demarcation 22 (the fourth pattern 32*d* not being visible in FIG. 4). Each weld pattern may exhibit a truss-type geometry that includes, for example, a larger triangle that has rounded corners and that has a pair of triangles located within it. Each of the triangles may be nested within the larger triangle such that the two sides of each of the triangles also forms a partial side of each of the triangles. Preferably, as shown in FIG. 4, the weld patterns 32*a*-32*d* are provided on the mask body 12 such that there is symmetry on each side of the line of demarcation 22, and preferably also on each side of an axis perpendicular to the line of demarcation, which in the embodiment illustrated in FIG. 4 is the longitudinal axis 34. Although the structural pattern 31 has been illustrated in the present drawings as being triangular patterns, the two-dimensional enclosed patterns may take on other truss-type forms, including quadrilaterals that are rectangular, trapezoidal, rhombical, etc., which are welded or stitched into the mask body. The structural pattern 31 may be an enclosed pattern or may also be a non-enclosed pattern. Alternative patterns include but are not limited to a plurality of straight or curved lines parallel and/or orthogonal to the line of demarcation 22.

In case of the structural pattern being a two-dimensional enclosed weld pattern, it may occupy a surface area of about 5 to 30 square centimeters ($cm^2$), more commonly about 10 to 16 $cm^2$.

The respirator illustrated in FIG. 4 has a front view analogue to that shown in FIG. 2 and can be collapsed or folded as illustrated in FIG. 3.

Figure 5:
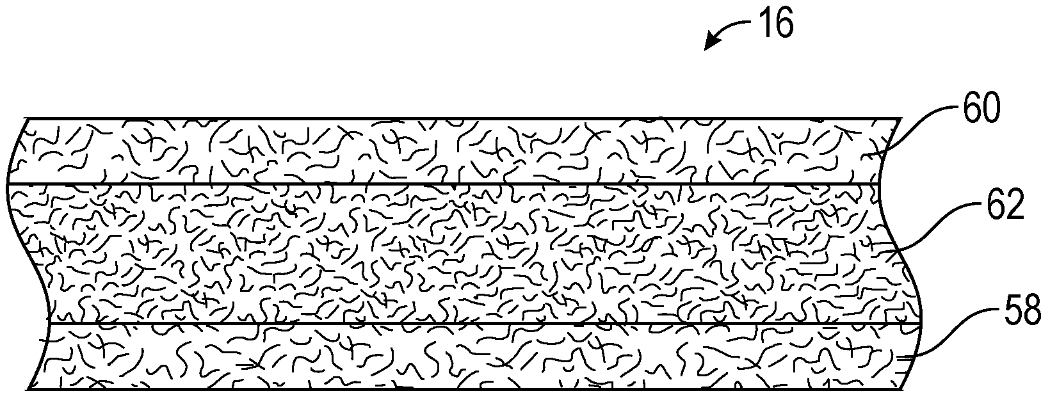
FIG. 5 is a cross-section of the filtering structure 16.

FIG. 5 illustrates that the filtering structure 16 of the respirators according to the present disclosure may include one or more layers such as an inner cover web 58, an outer cover web 60, and a filtration layer 62. The inner and outer cover webs 58 and 60 may be provided to protect the filtration layer 62 and to preclude fibers from the filtration layer 62 from coming loose and entering the mask interior. During respirator use, air passes sequentially through layers 60, 62, and 58 before entering the mask interior. The air that is disposed within the interior gas space of the mask may then be inhaled by the wearer. When a wearer exhales, the air passes in the opposite direction sequentially through layers 58, 62, and 60. Alternatively, an exhalation valve (not shown) may be provided on the mask body to allow exhaled air to be rapidly purged from the interior gas space to enter the exterior gas space without passing through filtering structure 16. Typically, the cover webs 58 and 60 are made from a selection of nonwoven materials that provide a comfortable feel, particularly on the side of the filtering structure that makes contact with the wearer's face. The construction of various filter layers and cover webs that may be used in conjunction with the support structure of the present invention are described below in more detail. To improve wearer fit and comfort, an elastomeric face seal can be secured to the perimeter 23 of the filtering structure 16. Such a face seal may extend radially inward to contact the wearer's face when the respirator is being donned. Examples of face seals are described in U.S. Pat. No. 6,568,392 to Bostock et al., U.S. Pat. No. 5,617,849 to Springett et al., and U.S. Pat. No. 4,600,002 to Maryyanek et al., and in Canadian Patent 1,296,487 to Yard. The filtering structure 16 may also have a structural netting or mesh juxtaposed against at least one or more of the layers 58, 60, or 62, typically against the outer surface of the outer cover web 60. The use of such a mesh is described in U.S. patent application Se. No. 12/338,091, filed Dec. 18, 2008, entitled Expandable Face Mask with Reinforcing Netting.

The mask body that is used in connection with the present disclosure may take on a variety of different shapes and configurations. Generally the shape and configuration of the filtering structure corresponds to the general shape of the mask body. Although a filtering structure has been illustrated with multiple layers that include a filtration layer and two cover webs, the filtering structure may simply include a filtration layer or a combination of filtration layers. For example, a pre-filter may be disposed upstream to a more refined and selective downstream filtration layer. Additionally, sorptive materials such as activated carbon may be disposed between the fibers and/or various layers that include the filtering structure. Further, separate particulate filtration layers may be used in conjunction with sorptive layers to provide filtration for both particulates and vapors. The filtering structure may include one or more stiffening layers that assist in providing a cup-shaped configuration. The filtering structure also could have one or more horizontal and/or vertical lines of demarcation that contribute to its structural integrity.

The filtering structure that is used in a mask body of the present disclosure can be of a particle capture or gas and vapor type filter. The filtering structure may also be a barrier layer that prevents the transfer of liquid from one side of the filter layer to another to prevent, for instance, liquid aerosols or liquid splashes (e.g. blood) from penetrating the filter layer. Multiple layers of similar or dissimilar filter media may be used to construct the filtering structure of the disclosure as the application requires. Filters that may be beneficially employed in a layered mask body of the invention are generally low in pressure drop (for example, less than about 195 to 295 Pascals at a face velocity of 13.8 centimeters per second) to minimize the breathing work of the mask wearer. Filtration layers additionally are flexible and have sufficient shear strength so that they generally retain their structure under the expected use conditions. Examples of particle capture filters include one or more webs of fine inorganic fibers (such as fiberglass) or polymeric synthetic fibers. Synthetic fiber webs may include electret-charged polymeric microfibers that are produced from processes such as meltblowing. Polyolefin microfibers formed from polypropylene that has been electrically charged provide particular utility for particulate capture applications. An alternate filter layer may include a sorbent component for removing hazardous or odorous gases from the breathing air. Sorbents may include powders or granules that are bound in a filter layer by adhesives, binders, or fibrous structures. See U.S. Pat. No. 6,334,671 to Springett et al. and 3,971,373 to Braun. A sorbent layer can be formed by coating a substrate, such as fibrous or reticulated foam, to form a thin coherent layer. Sorbent materials may include activated carbons that are chemically treated or not, porous alumina-silica catalyst substrates, and alumna particles. An example of a sorptive filtration structure that may be conformed into various configurations is described in U.S. Pat. No. 6,391,429 to Senkus et al.

The filtration layer is typically chosen to achieve a desired filtering effect. The filtration layer generally will remove a high percentage of particles and/or other contaminants from the gaseous stream that passes through it. For fibrous filter layers, the fibers selected depend upon the kind of substance to be filtered and, typically, are chosen so that they do not become bonded together during the molding operation. As indicated, the filtration layer may come in a variety of shapes and forms and typically has a thickness of about 0.2 millimeters (mm) to 1 centimeter (cm), more typically about 0.3 mm to 0.5 cm, and it could be a generally planar web or it could be corrugated to provide an expanded surface area. See, for example, U.S. Pat. Nos. 5,804,295 and 5,656,368 to Braun et al. The filtration layer also may include multiple filtration layers joined together by an adhesive or any other means. Essentially any suitable material that is known (or later developed) for forming a filtering layer may be used as the filtering material. Webs of melt-blown fibers, especially when in a persistent electrically charged (electret) form, are especially useful (see, for example, U.S. Pat. No. 4,215,682 to Kubik et al.). These melt-blown fibers may be microfibers that have an effective fiber diameter less than about 20 micrometers (μm) (referred to as BMF for "blown microfiber"), typically about 1 to 12 μm. Effective fiber diameter may be determined according to Davies, C. N., The Separation Of Airborne Dust Particles, Institution Of Mechanical Engineers, London, Proceedings 1B, 1952. Particularly preferred are BMF webs that contain fibers formed from polypropylene, poly(4-methyl-1-pentene), and combinations thereof. Electrically charged fibrillated-film fibers may also be suitable, as well as rosin-wool fibrous webs and webs of glass fibers or solution-blown, or electrostatically sprayed fibers, especially in microfilm form. Electric charge can be imparted to the fibers by contacting the fibers with water as disclosed, for example, in U.S. Pat. No. 6,824,718 to Eitzman et al., U.S. Pat. No. 6,783,574 to Angadjivand et al., U.S. Pat. No. 6,743,464 to Insley et al., U.S. Pat. Nos. 6,454,986 and 6,406,657 to Eitzman et al., and U.S. Pat. No. 6,375,886 and 5,496,507 to Angadjivand et al. Electric charge also may be imparted to the fibers by corona charging as disclosed in U.S. Pat. No. 4,588,537 to Klasse et al. or by tribocharging as disclosed in U.S. Pat. No. 4,798,850 to Brown. Also, additives can be included in the fibers to enhance the filtration performance of webs produced through the hydro-charging process (see U.S. Pat. No. 5,908,598 to Rousseau et al.). Fluorine atoms, in particular, can be disposed at the surface of the fibers in the filter layer to improve filtration performance in an oily mist environment. See U.S. Pat. Nos. 6,398,847 B1, 6,397,458 B1, and 6,409,806 B1 to Jones et al.

An inner cover web can be used to provide a smooth surface for contacting the wearer's face, and an outer cover web can be used to entrap loose fibers in the mask body or for aesthetic reasons. The cover web typically does not provide any substantial filtering benefits to the filtering structure, although it can act as a pre-filter when disposed on the exterior (or upstream to) the filtration layer. To obtain a suitable degree of comfort, an inner cover web preferably has a comparatively low basis weight and is formed from comparatively fine fibers. More particularly, the cover web may be fashioned to have a basis weight of about 5 to 50 g/m$^2$ (typically 10 to 30 g/m$^2$), and the fibers may be less than 3.5 denier (typically less than 2 denier, and more typically less than 1 denier but greater than 0.1). Fibers used in the cover web often have an average fiber diameter of about 5 to 24 micrometers, typically of about 7 to 18 micrometers, and more typically of about 8 to 12 micrometers. The cover web material may have a degree of elasticity (typically, but not necessarily, 100 to 200% at break) and may be plastically deformable. Suitable materials for the cover web may be blown microfiber (BMF) materials, particularly polyolefin BMF materials, for example polypropylene BMF materials (including polypropylene blends and also blends of polypropylene and polyethylene). A suitable process for producing BMF materials for a cover web is described in U.S. Pat. No. 4,013,816 to Sabee et al. The web may be formed by collecting the fibers on a smooth surface, typically a smooth-surfaced drum or a rotating collector. See U.S. Pat. No. 6,492,286 to Berrigan et al. Spun-bond fibers also may be used.

A typical cover web may be made from polypropylene or a polypropylene/polyolefin blend that contains 50 weight percent or more polypropylene. These materials have been found to offer high degrees of softness and comfort to the wearer and also, when the filter material is a polypropylene BMF material, to remain secured to the filter material without requiring an adhesive between the layers. Polyolefin materials that are suitable for use in a cover web may include, for example, a single polypropylene, blends of two polypropylenes, and blends of polypropylene and polyethylene, blends of polypropylene and poly(4-methyl-1-pentene), and/or blends of polypropylene and polybutylene. One example of a fiber for the cover web is a polypropylene BMF made from the polypropylene resin "Escorene 3505G" from Exxon Corporation, providing a basis weight of about 25 g/m$^2$ and having a fiber denier in the range 0.2 to 3.1 (with an average, measured over 100 fibers of about 0.8). Another suitable fiber is a polypropylene/polyethylene BMF (produced from a mixture including 85 percent of the resin "Escorene 3505G" and 15 percent of the ethylene/alpha-olefin copolymer "Exact 4023" also from Exxon Corporation) providing a basis weight of about 25 g/m$^2$ and having an average fiber denier of about 0.8. Suitable spunbond materials are available, under the trade designations "Corosoft Plus 20", "Corosoft Classic 20" and "Corovin PP-S-14", from Corovin GmbH of Peine, Germany, and a carded polypropylene/viscose material available, under the trade designation "370/15", from J. W. Suominen OY of Nakila, Finland.

Cover webs that are used in the present disclosure preferably have very few fibers protruding from the web surface after processing and, therefore, have a smooth outer surface. Examples of cover webs that may be used in the present disclosure are disclosed, for example, in U.S. Pat. No. 6,041,782 to Angadjivand, U.S. Pat. No. 6,123,077 to Bostock et al., and WO 96/28216A to Bostock et al.

The strap(s) that are used in the harness may be made from a variety of materials, such as thermoset rubbers, thermoplastic elastomers, braided or knitted yarn/rubber combinations, inelastic braided components, and the like. The strap(s) may be made from an elastic material such as an elastic braided material. The strap preferably can be expanded to greater than twice its total length and be returned to its relaxed state. The strap also could possibly be increased to three or four times its relaxed state length and can be returned to its original condition without any damage thereto when the tensile forces are removed. The elastic limit thus is preferably not less than two, three, or four times the length of the strap when in its relaxed state. Typically, the strap(s) are about 20 to 30 cm long, 3 to 10 mm wide, and about 0.9 to 1.5 mm thick. The strap(s) may extend from the first tab to the second tab as a continuous strap or the strap may have, a plurality of parts, which can be joined together by further fasteners or buckles. For example, the strap may have first and second parts that are joined together by a fastener that can be quickly uncoupled by the wearer when removing the mask body from the face. An example of a strap that may be used in connection with the present disclosure is shown in U.S. Pat. No. 6,332,465 to Xue et al. Examples of fastening or clasping mechanisms that may be used to join one or more parts of the strap together are shown, for example, U.S. Pat. No. 6,062,221 to Brostrom et al., U.S. Pat. No. 5,237,986 to Seppala, and EP1,495,785A1 to Chien.

As mentioned herein, the filtering face-piece respirators can include any suitable exhalation valves. For example, FIGS. 6-9 are various views of one embodiment of a foldable filtering face-piece respirator 200. The respirator 200 includes a mask body 212, an exhalation valve 270, and a support element 276 connected to a base 272 of the exhalation valve. All of the design considerations and possibilities regarding the respirator 10 of FIGS. 1-5 apply equally to the respirator 200 of FIGS. 6-9. Although not shown, the respirator 200 can also include a harness that can be connected to the mask body 212 in any suitable location using any suitable technique or combination of techniques.

Figure 6:
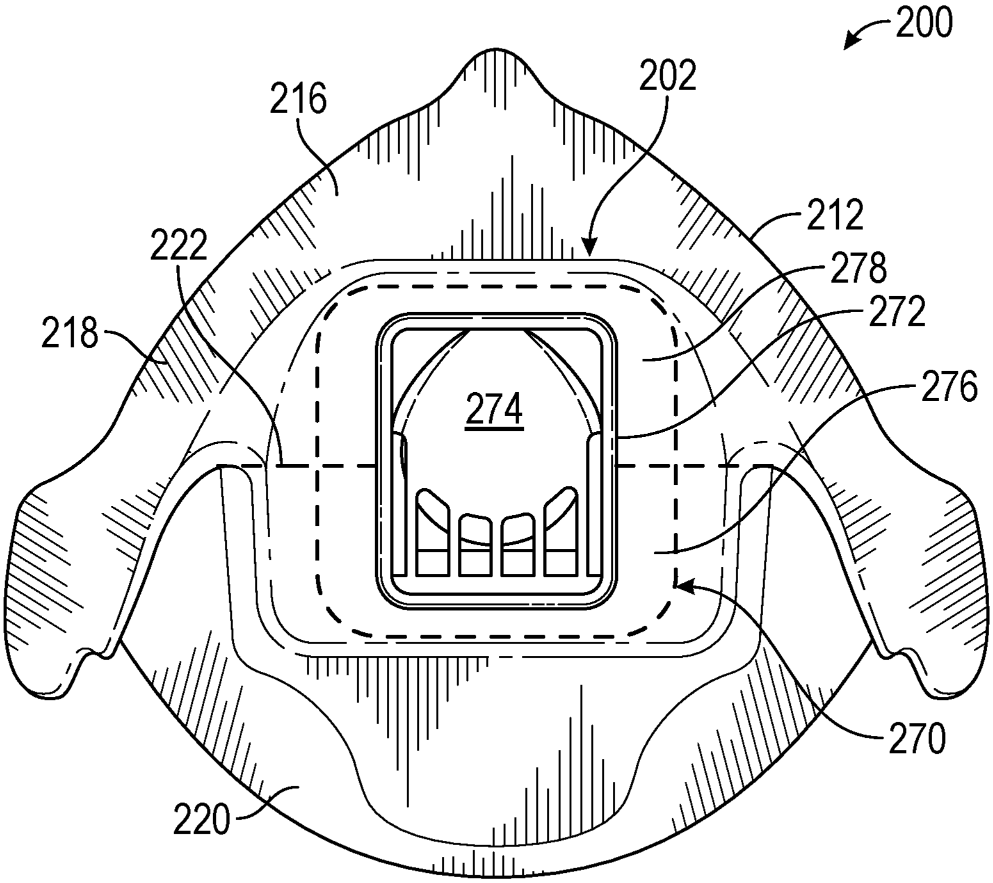
FIG. 6 is a schematic front plan view of another embodiment of a foldable filtering face-piece respirator.

As illustrated in FIG. 6, the mask body 212 includes a first portion 218 and a second portion 220 that are separated by a line of demarcation 222. The line of demarcation 222 can be any suitable line of demarcation. In one or more embodiments, the line of demarcation 222 includes a mask body fold line.

The line of demarcation 222 can extend transversely across the mask body 212 such that the first portion 218 includes an upper portion of the mask body and the second portion 220 includes a lower portion of the mask body as is illustrated in FIG. 6. In one or more embodiments, the line of demarcation 222 can extend vertically from a top perimeter segment to a bottom perimeter segment as is further described herein.

Figure 9:
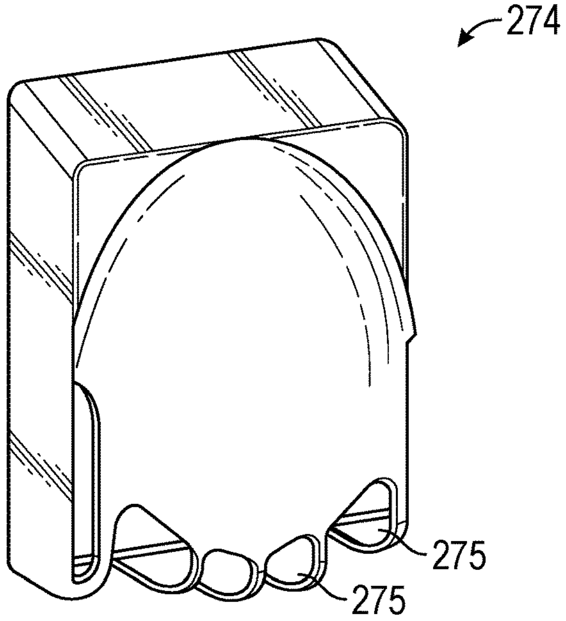
FIG. 9 is a schematic perspective view of a valve cover of the exhalation valve of FIG. 7.

The exhalation valve 270 is disposed on the line of demarcation 222 in any suitable location. In one or more embodiments, the exhalation valve 270 is disposed on the line of demarcation 222 and in a central region 202 of the mask body 212. As used herein, the term "central region" refers to a portion of the mask body 212 that is disposed directly or in proximity to the wearer's mouth when the respirator 200 is donned by a wearer. The exhalation valve 270 can be any suitable exhalation valve described herein. In the embodiment illustrated in FIG. 6, the exhalation valve 270 includes a base 272 (FIG. 7) and a cover 274 (FIG. 9)

that is attached to the base. The exhalation valve 270 can also include a valve flap 280 (FIG. 8).

Figure 7:
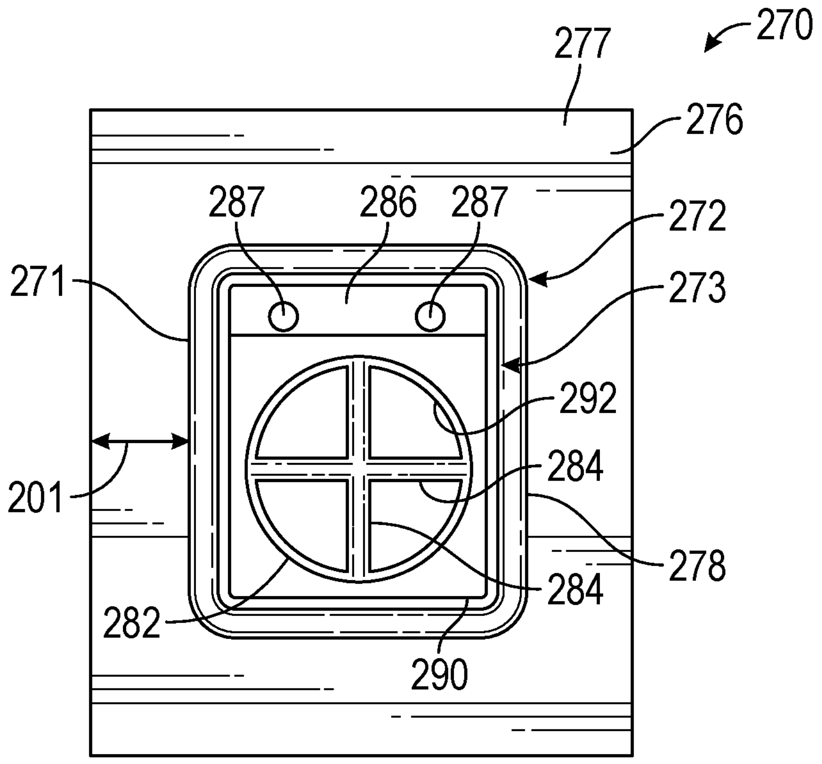
FIG. 7 is a schematic front plan view of an exhalation valve of the respirator of FIG. 6.
Figure 8:
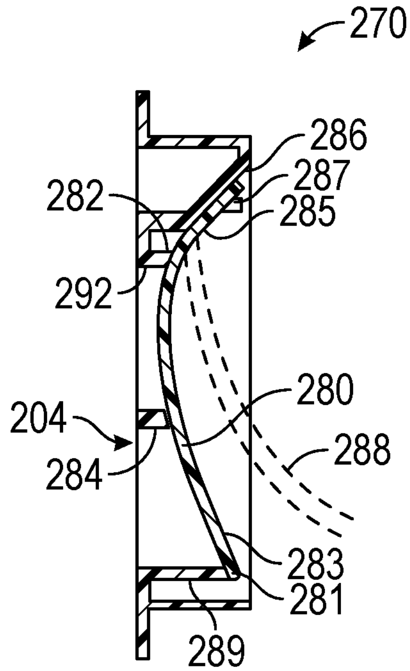
FIG. 8 is a schematic cross-section view of the exhalation valve of FIG. 7.

As shown in FIGS. 7-8, the base 272 of the exhalation valve 270 includes a valve seat 273 having a seal surface 282 that extends from the base, and a flap-retaining surface 286 that also extends from the base. The base 272 also includes an engagement surface 290 that is adapted to engage the cover 274, thereby connecting the cover to the base. The engagement surface 290 can include any suitable shape or combination of shapes such that the cover 274 remains attached to the base 272 but can removed when desired, e.g., the engagement surface forms a friction-fit with the cover.

The valve flap 280 rests on the seal surface 282 when the flap is closed and is also supported in cantilevered fashion to the valve seat 273 at the flap-retaining surface 286. The flap 280 lifts from the seal surface 282 at its free end 281 when a significant pressure is reached in an interior gas space of the respirator 200 during an exhalation. The seal surface 282 can take any suitable shape or combination of shapes. In one or more embodiments, the seal surface 282 can be adapted to generally curve in the longitudinal dimension in a concave cross-section when viewed from a side elevation (FIG. 8) and may be non-aligned and relatively positioned with respect to the flap-retaining surface 286 to allow the flap to be biased or pressed towards the seal surface under neutral conditions, i.e., when the wearer is neither inhaling or exhaling. The seal surface 282 may reside at the extreme end of a seal ridge 289. The flap 280 can also have a transverse curvature imparted to it as described, e.g., in U.S. Pat. No. 5,687,767, reissued as Re 37,974 to Bowers.

When a wearer of the respirator 200 exhales, the exhaled air commonly passes through both the mask body 212 and the exhalation valve 270. Comfort is best obtained when the highest percentage of the exhaled air passes through the exhalation valve 270, as opposed to the filter media and/or shaping and cover layers in the mask body. Exhaled air is expelled from the interior gas space through an orifice 292 in valve 270 by having the exhaled air lift the valve flap 280 from the seal surface 282. The circumferential or peripheral edge of the valve flap 280 that is associated with a fixed or stationary portion 285 of the flap remains essentially stationary during an exhalation, while the remaining free circumferential edge of valve flap is lifted from seal surface 282 during an exhalation.

The valve flap 280 is secured at the stationary portion 285 to the valve seat 273 on the flap retaining surface 286, which surface is disposed non-centrally relative to the orifice 292 and can have pins 287 to help mount and position the flap on the valve seat. Valve flap 280 can be secured to the surface 286 using, e.g., sonic welding, an adhesive, mechanical clamping, and the like.

FIG. 8 shows the valve flap 280 in a closed position resting on seal surface 282 and in an open position by the dotted lines 288. A fluid passes through the valve 270 in the general direction indicated by arrow 204. If valve 270 is used on a filtering face-piece respirator to purge exhaled air from the respirator's interior, fluid flow 204 would represent an exhale flow stream. If valve 270 is utilized as an inhalation valve, flow stream 204 would represent an inhale flow stream. The fluid that passes through orifice 292 exerts a force on the valve flap 280, causing the free end 283 of the flap to be lifted from seal surface 282 to dispose the valve in the open position. When valve 270 is used as an exhalation valve, the valve is oriented on respirator 200 such that the free end 283 of the valve flap 280 is located below the secured end when the respirator is positioned upright as shown in FIG. 6. This enables exhaled air to be deflected downwards to prevent moisture from condensing on the wearer's eyewear.

FIG. 7 shows the base 272 from a front view with the valve flap 280 removed for clarity. The valve orifice 292 is disposed radially inward from the seal surface 282 and can have cross members 284 that stabilize the seal surface and ultimately the valve 270. The cross members 284 also can prevent the valve flap 280 from inverting into orifice 292 during an inhalation. Moisture build-up on the cross members 284 can hamper the opening of the flap 280; therefore, the surfaces of the cross-members 284 that face the flap can be slightly recessed beneath the seal surface 282 when viewed from a side elevation (FIG. 8) to not hamper valve opening.

The seal surface 282 circumscribes or surrounds the orifice 292 to prevent the undesired passage of contaminates through it. Seal surface 282 and the valve orifice 292 can take on essentially any shape when viewed from the front. For example, the seal surface 282 and the orifice 292 may be square, rectangular, circular, elliptical, etc. The shape of seal surface 282 does not have to correspond to the shape of orifice 292 or vice versa. For example, the orifice 292 may be circular and the seal surface 282 may be rectangular. The seal surface 282 and orifice 292, can, however, have a circular cross-section when viewed against the direction of fluid flow.

The base 272 can include any suitable material or combination of materials. In one or more embodiments, the base 272 can include a relatively lightweight plastic that is molded into an integral one-piece body. The base 272 can be manufactured utilizing injection molding techniques. The seal surface 282 that makes contact with the valve flap 280 can be formed to be substantially uniformly smooth to ensure that a good seal occurs and may reside on the top of a seal ridge. The seal surface 282 can, in one or more embodiments, have a width great enough to form a seal with the valve flap 282 but is not so wide as to allow adhesive forces caused by condensed moisture to make the valve flap significantly more difficult to open. In one or more embodiments, the width of the seal surface 280 can be at least 0.2 mm, and no greater than 0.5 mm. The valve 270 and its base 272 shown in FIGS. 7-8 are more fully described, e.g., in U.S. Pat. Nos. 5,509,436 and 5,325,892 to Japuntich et al.

FIG. 9 shows a valve cover 274 that may be suitable for use with the exhalation valve shown in the other FIGS. 7-8. The valve cover 274 defines an internal chamber into which the valve flap 280 can move from its closed position to its open position. The valve cover 274 can protect the valve flap 280 from damage and can assist in directing exhaled air downward away from a wearer's eyeglasses. As shown, the valve cover 274 may include one or more openings 275 to allow exhaled air to escape from the internal chamber defined by the valve cover. Air that exits the internal chamber through the openings 275 enters the exterior gas space in a generally downward direction and away from the wearer's eyewear.

As mentioned herein, the exhalation valve 270 includes the support element 276 that is connected to the base 272 of the valve and that extends from a perimeter 271 of the base. The support element 276 is in contact with the mask body 212 when the mask body is in a cup-shaped configuration as shown in FIG. 6. In one or more embodiments, the support element 276 can assist the mask body 212 of the respirator in maintaining a cup-shaped configuration when the respirator is being utilized by the wearer. In one or more embodiments, the support element 276 can help prevent collapse of the mask body 212 when the respirator 270 is being utilized by the wearer.

The support element 276 can take any suitable shape or combination of shapes and have any suitable dimensions. The support element 276 can extend from the entire perimeter 271 of the base 272 such that the support element completely surrounds the base. For example, as shown in FIG. 7, the support element 276 completely surrounds the base 272 of the exhalation valve 270. In one or more embodiments, the support element 276 can extend from a portion or portions of the perimeter 271 of the base 272 as is further described herein.

Mask body 212 can include any suitable mask body described herein. In one or more embodiments, the mask body 212 can include an inner cover web, an outer cover web, and filter media disposed between the inner cover web and the outer cover web. In one or more embodiments, the support element 276 can be disposed between the filter media and the inner cover web of the mask body 212. In one or more embodiments, the support element 276 can be disposed between the filter media and the outer cover web of the mask body 212. Further, in one or more embodiments, the support element 276 can be disposed on an outer surface of the outer cover web of the mask body 212. In addition, in one or more embodiments, the support element 276 can be disposed on an inner surface of the inner cover web of the mask body 212.

Further, the support element 276 can have any suitable dimensions. In one or more embodiments, the support element 276 can extend a distance 201 from the perimeter 271 of the base 272 of at least 5 mm and no greater than 50 mm.

In one or more embodiments, the support element 276 is integral with the base 272. In one or more embodiments, the support element 276 is separately manufactured and connected to the base 272 using any suitable technique or combination of techniques.

The support element 276 can include any suitable material or combination of materials. In one or more embodiments, the support element 276 includes the same materials as those used to form the base 272. In one or more embodiments, the support element 276 can include a material or combination materials that are different from the materials utilized to form the base 272.

The support element 276 can be a unitary part. In one or more embodiments, the support element 276 can include one or more air channels or openings disposed through the support element that provide a fluid path between the interior gas space of the respirator 200 and the exterior gas space. Such one or more air channels can be adapted to direct air incident on the support element 276 through the mask body 212. For example, in one or more embodiments, the support element 276 can include an air permeable support element. Any suitable technique or combination of techniques can be utilized to form the air permeable support element. For example, in one or more embodiments, one or more openings can be formed through the support elemment 276 such that the member is air permeable. In one or more embodiments, the air permeable support element 276 can include an open work structure. Further, in one or more embodiments, the air permeable support element 276 can include a mesh.

Figure 10:
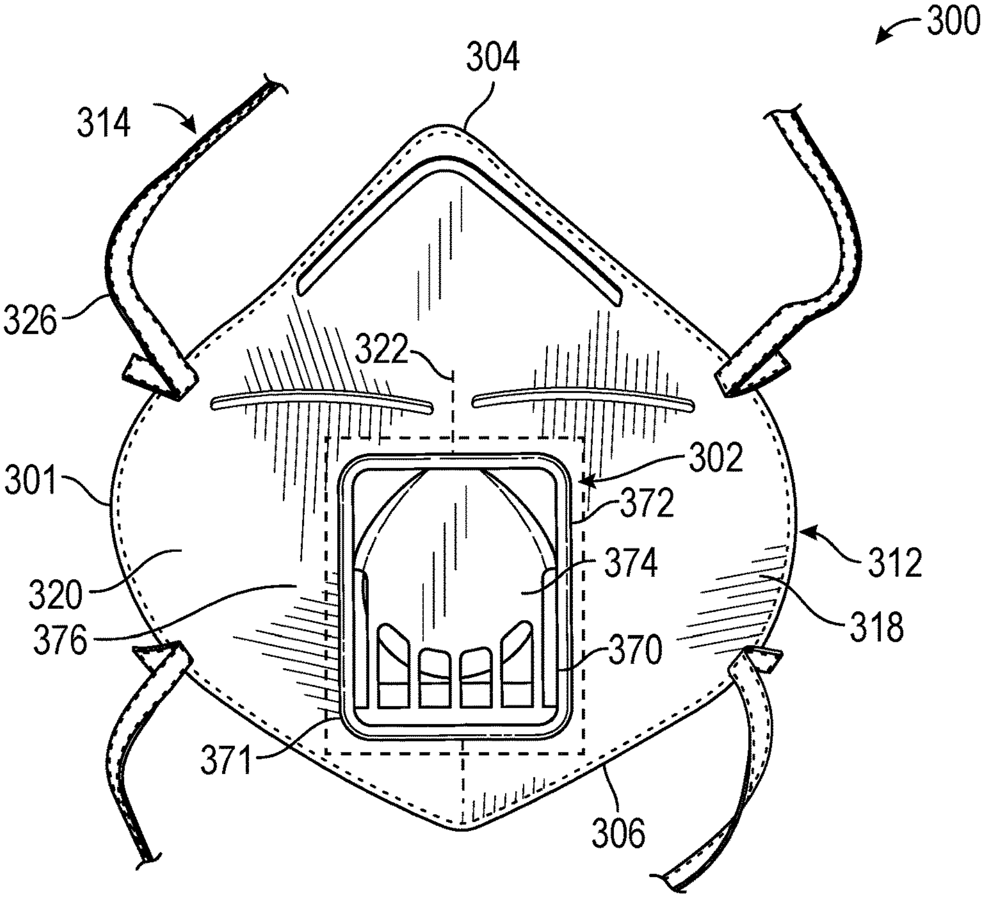
FIG. 10 is a schematic front plan view of another embodiment of a foldable filtering face-piece respirator.

As mentioned herein, one or more embodiments of a filtering face-piece respirator can include a vertical line of demarcation that extends from a top perimeter segment of a mask body of the respirator to a bottom perimeter segment. For example, FIG. 10 is a schematic perspective view of another embodiment of a filtering face-piece respirator 300. All of the design considerations and possibilities regarding the filtering face-piece respirator 200 of FIGS. 6-9 apply equally to the filtering face-piece respirator 300 of FIG. 10.

The respirator 300 includes a mask body 312 that includes a first portion 318 and a second portion 320 separated by a vertical line of demarcation 322. The line of demarcation 322 includes a mask body fold line. The respirator 300 also includes a harness 314 having one or more straps 326 connected to the mask body 312. An exhalation valve 370 is disposed on the line of demarcation 322 in a central region 302 of the mask body 313. The line of demarcation 322 extends vertically from a top perimeter segment 304 to a bottom perimeter segment 306 of a perimeter 301 of the mask body. As such, the first portion 318 includes a right portion of the mask body 312 and the second portion 320 includes a left portion of the mask body. The exhalation valve 370 can include any suitable exhalation valve, e.g., exhalation valve 270 of FIGS. 6-9. The exhalation valve 370 includes a base 372 and a cover 374 attached to the base.

The respirator 300 also includes a support element 376 connected to the base 372 that extends from a perimeter 371 of the base. The support element 376 is in contact with the mask body 312 when the mask body is in a cup-shaped configuration as is shown in FIG. 10.

Figure 11:
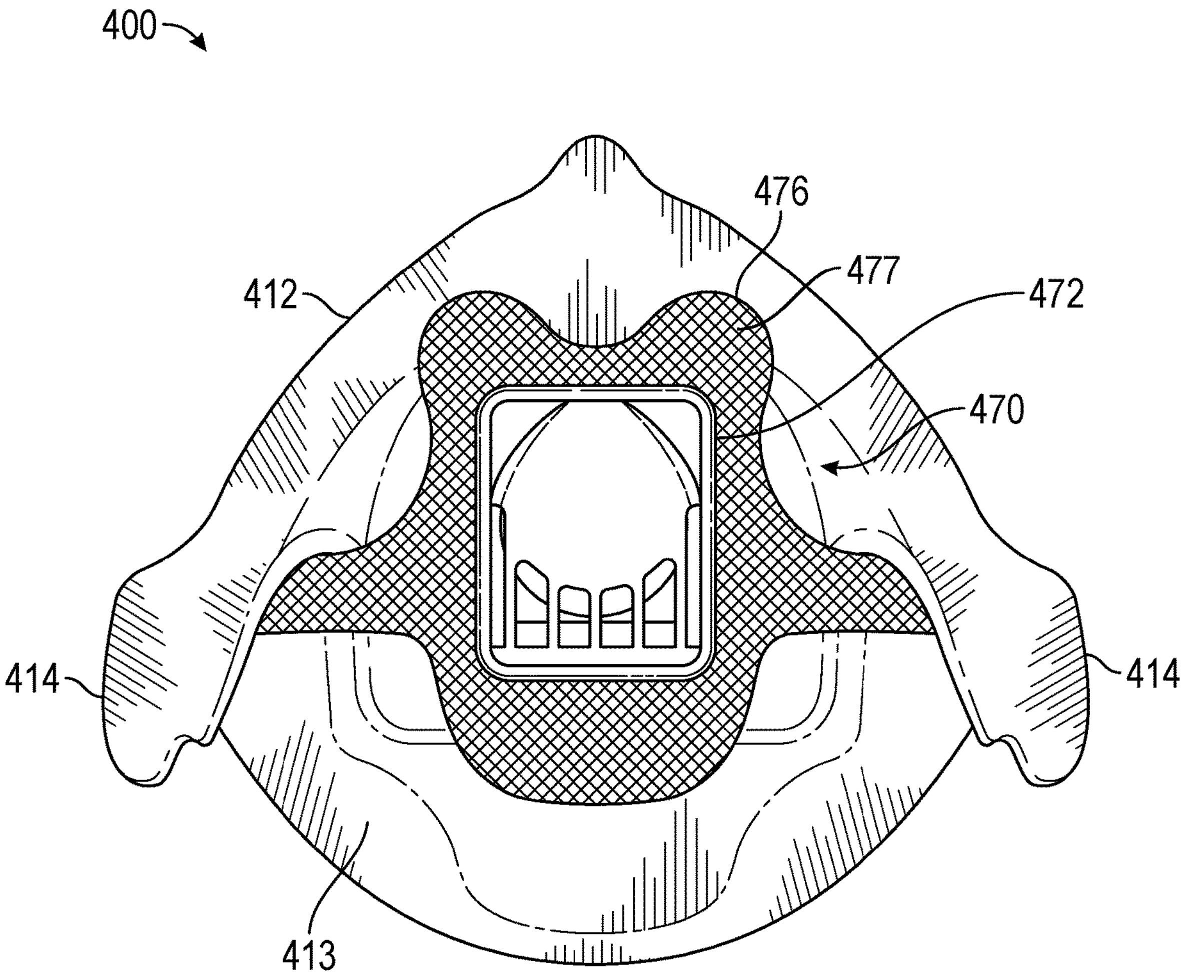
FIG. 11 is a schematic front plan view of another embodiment of a foldable filtering face-piece respirator.

As mentioned herein, the support element of one or more embodiments of exhalation valves can include one or more openings that can allow fluid to flow through the support element when a wearer exhales. For example, FIG. 11 is a schematic perspective view of another embodiment of a respirator 400. All of the design considerations and possibilities regarding the respirator 200 of FIGS. 6-9 apply equally to the respirator 400 of FIG. 11. One difference between respirator 400 and respirator 200 is that the respirator 400 includes a support element 476 that includes a mesh 477 and that is connected to a base 472 of respirator valve 470 and is disposed on an outer surface 413 of a mask body 412.

Another difference between respirator 400 and respirator 200 is that support element 476 can be disposed or tucked inside side tabs 414 of mask body 412 of the respirator. By tucking the support element 476 into the side tabs 414, the support element can reinforce the side tabs and provide additional support to the mask body 412 of the respirator.

Figure 12:
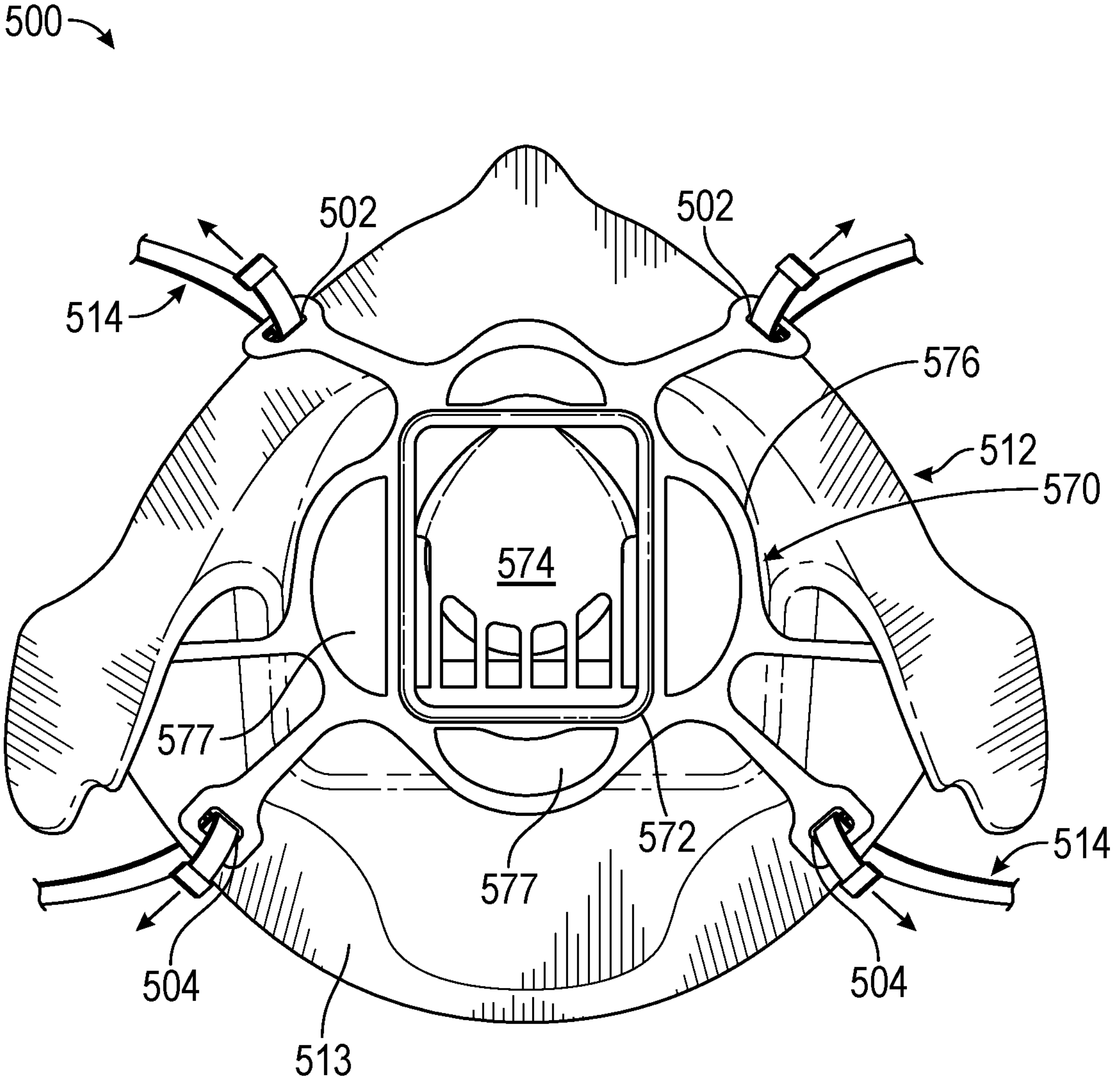
FIG. 12 is a schematic front plan view of another embodiment of a foldable filtering face-piece respirator.

As mentioned herein, the support element can take any suitable shape or combination of shapes. Further the support element can provide additional functionality to the respirator. For example, FIG. 12 is a schematic perspective view of another embodiment of a respirator 500. All of the design considerations and possibilities regarding the respirator 200 of FIGS. 6-9 apply equally to the respirator 500 of FIG. 12. The respirator 500 includes an exhalation valve 570 having a base 572 and a cover 574 connected to the base. The respirator 500 also includes a support element 576 connected to the base 572 of the valve 570 and disposed on an outer surface 513 of mask body 512. The support element 576 includes openings 577 that allow air or fluid to pass between an interior gas space and an exterior gas space of the mask body 512 of the respirator 500. The support element 576 also includes upper loops 502 and lower loops 504 that are adapted to connect the exhalation valve 570 to a harness 514. Straps of the harness 514 can be fed through the loops 502, 504 and attached to the support element 576 using any suitable technique or combination of techniques.

Figure 13:
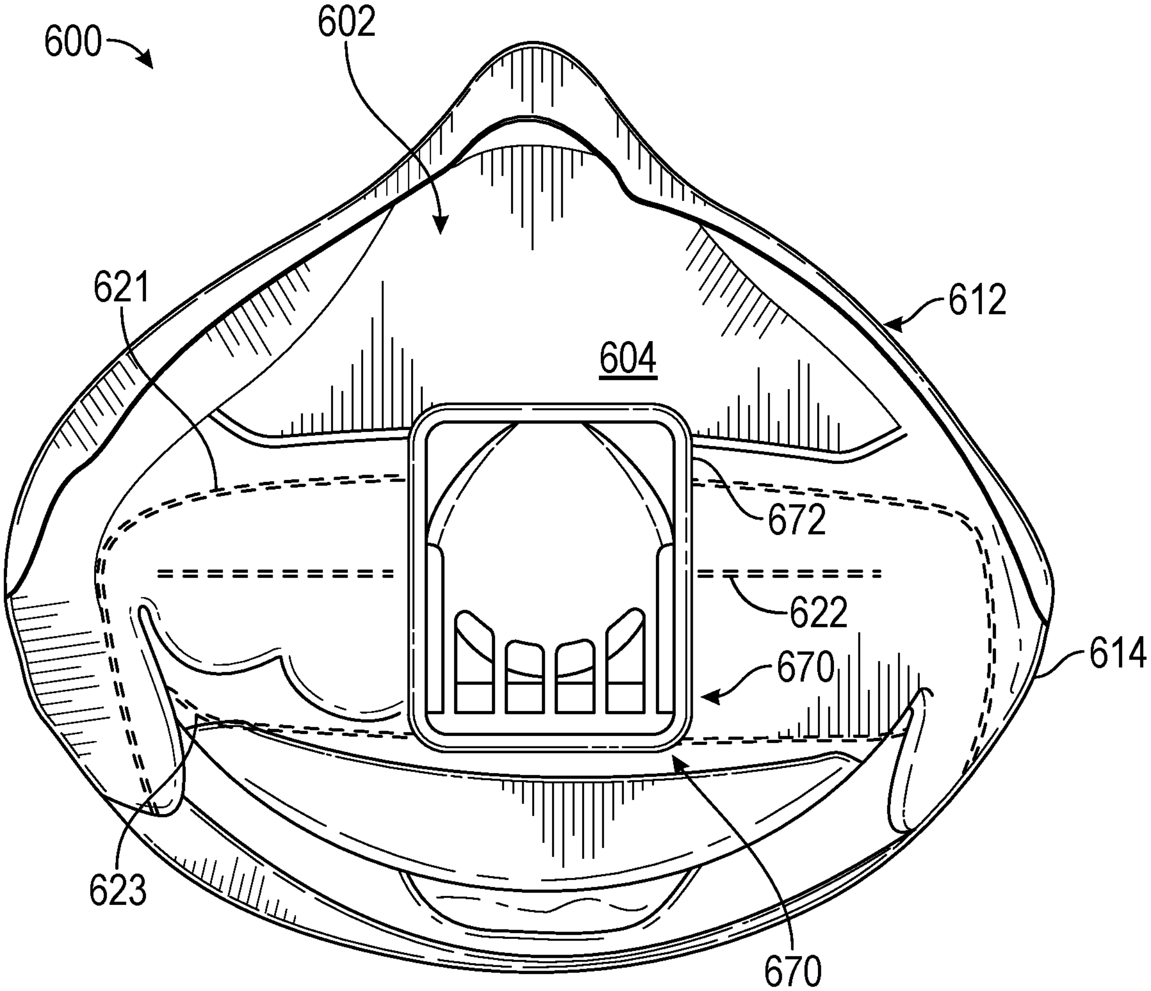
FIG. 13 is a schematic front plan view of another embodiment of a foldable filtering face-piece respirator.

The respirators described herein can include one or more lines of demarcation disposed in a mask body of the respirator. For example, FIG. 13 is a schematic perspective view of another embodiment of a filtering face-piece respirator 600. All of the design considerations and possibilities regarding the respirator 200 of FIGS. 6-9 apply equally to the respirator 600 of FIG. 13. One difference between respirator 600 and respirator 200 is that mask body 612 of respirator 600 includes a first line of demarcation 622 that provides a mask body fold line, a second line of demarcation 621, and a third line of demarcation 623. Each of the lines of demarcation 621, 622, 623 extends transversely across the mask body 612. The respirator 600 also includes an exhalation valve 670 disposed on the first line of demarcation 622 in a central region 602 of the mask body 612. In one or more embodiments, the exhalation valve 670 can also be disposed on one or both of the second line of demarcation 621 and the third line of demarcation 623. Further, the second line of demarcation 621 extends into side tabs 614 and can create a dual truss structure that can provide additional collapse resistance to the mask body 612.

Another difference between respirator 600 and respirator 200 is that the exhalation valve 670 is that the valve 670 does not include a support element. Instead, in the illustrated embodiment, the lines of demarcation 621, 622, 623 can provide support to the mask body 612. In one or more embodiments, the respirator can include one or more support elements a is described herein.

Figure 14:
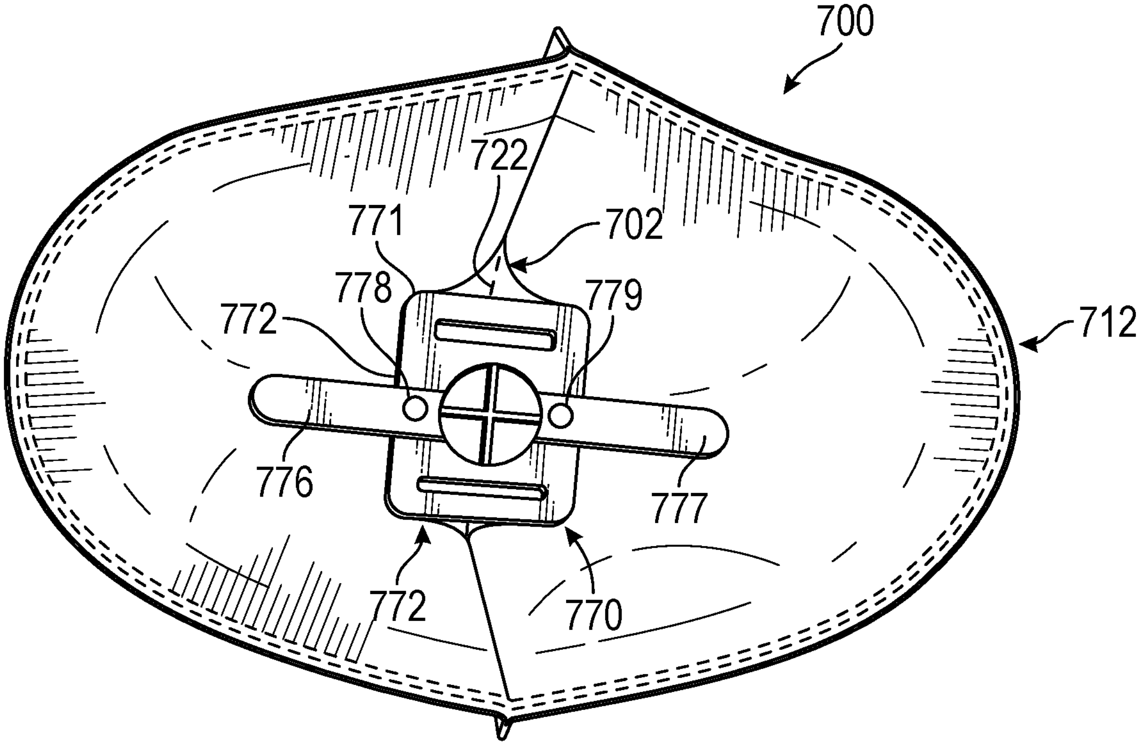
FIG. 14 is a schematic rear plan view of another embodiment of a foldable filtering face-piece respirator.

As mentioned herein, a support element that is connected to a base of an exhalation valve can completely surround the base. In one or more embodiments, the support element can include two or more elements or portions that extend from a perimeter of the base to provide additional support to a mask body of a respirator. For example, FIG. 14 is a schematic perspective rear view of another embodiment of a filtering face-piece respirator 700. All of the design considerations and possibilities regarding the respirator 200 of FIGS. 6-9 apply equally to the respirator 700 of FIG. 14. The respirator 700 includes a mask body 712 that includes a line of demarcation 722. In the embodiment illustrated in FIG. 14, the line of demarcation 722 is a vertical line of demarcation. The respirator 700 also includes an exhalation valve 770 disposed on the line of demarcation 722 in a central region 702 of the mask body 712. The exhalation valve 770 includes a base 772 and a cover (not shown) attached to the base. The respirator 700 also includes a support element 776 that is connected to the base 772 of the exhalation valve 770 and extends from a perimeter 771 of the base. The respirator 700 also includes a second support element 777 that is also connected to the base 772 of the valve 770 and extends from the perimeter 771 of the base. The support element 776 is connected to the base 772 at a first pivot point 778, and the second support element 777 is connected to the base at a second pivot point 779. Although illustrated as including two support elements, the respirator 700 can include any suitable number of support elements that are connected to the base 772 of the valve 270.

In one or more embodiments, one or both of the support element 776 and second support element 777 are adapted to pivot about respective pivot points 778, 779 such that the support elements can be disposed in a position where they are in contact with the mask body 712 when the mask body is in a cup-shaped configuration as shown in FIG. 14. The support elements 776, 777 can, therefore, be pivoted about the pivot points 778, 779 such that they are disposed substantially over the base 772 when the respirator 700 is in a storage configuration, i.e., is folded flat for storage. Such support elements 776, 777 can provide additional support to the mask body 712 when they are extended from the perimeter 771 of the base 772.

Respirators according to the present disclosure can be prepared using any suitable technique or combination of techniques. Respirators with structural patterns may be prepared as described, e.g., in EP2298419 A1 (Spoo et al.). An exhalation valve is then attached to the mask body. Essentially any exhalation valve that facilitates purging exhaled air from the interior gas space and that can be properly secured to the mask body may be used in connection with the present disclosure to rapidly deliver exhaled air from the interior gas space to the exterior gas space. Generally, an exhalation valve contains a valve seat. The valve seat typically contains an orifice that carries a flexible valve flap. The orifice typically is circular or elliptical. The valve flap is designed to seal against the valve seat and close the orifice when the wearer of the respiratory mask inhales, and to lift away from the valve seat and open the orifice when the wearer exhales. Inhaled air thus enters the mask through the filter media of the mask, whereas exhaled air passes out through the exhalation aperture in the mask, the orifice in the valve seat, and finally through openings in the valve cover. The valve cover or valve housing is placed on the exterior side of the mask (the side facing away from the wearer during use). The valve housing may have a longest axis or diameter from about 1 cm to about 6 cm. It may have any suitable shape, typically it is rectangular, circular or elliptical. It might be connected through the mask body with the valve seat. In other embodiments the valve housing is not attached to the valve seat but simply to the mask body. Known exhalation valves may be used. See, e.g., U.S. Pat. Nos. 7,188,622, 7,028,689, and 7,013,895 to Martin et al.; U.S. Pat. Nos. 7,428,903, 7,311,104, 7,117,868, 6,854,463, 6,843,248, and 5,325,892 to Japuntich et al.; 6,883,518 to Mittelstadt et al.; and RE37,974 to Bowers. The exhalation valve (or its housing and valve seat) may be attached to the respiratory mask by known methods, for example, by ultrasonic welding or by using adhesives, as described, for example, in WO99/24119. Prior to attaching the valve to the mask, an orifice, for example, a circular orifice, can be created in the mask body for receiving the valve seat or the flap/diaphragm of the exhalation valve. The valve seat may be attached at the inner side of the mask body and the valve housing on the opposite, outer side of the mask body. An aperture can be created on the line of demarcation, for example, by punching a hole through the line of demarcation. Alternatively, the mask body of the respirator may be configured and assembled such that it provides a hole at the desired position, thereby not requiring a hole-punching step.

Figure 15:
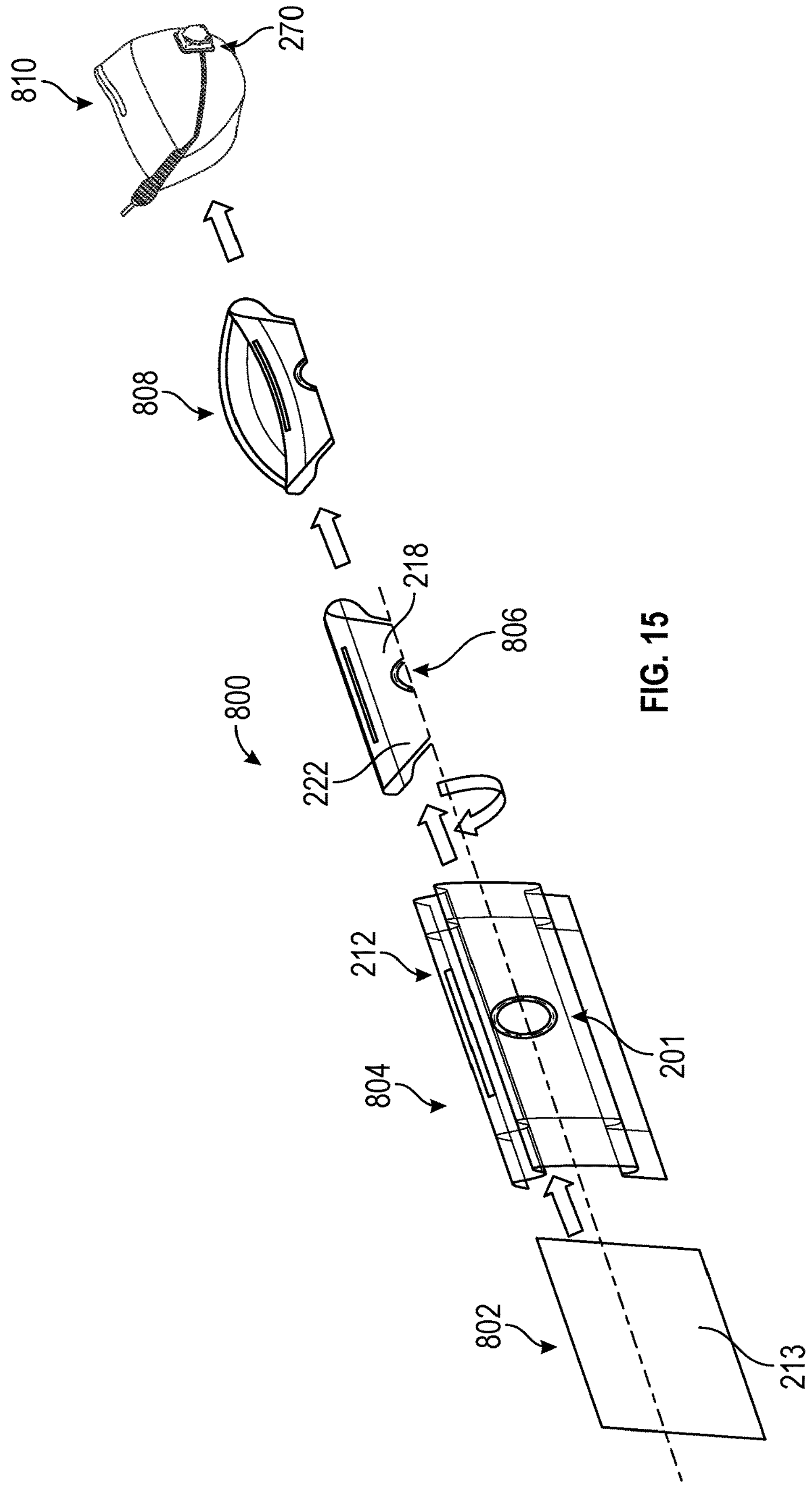
FIG. 15 is a schematic plan view of one embodiment of a method of making a filtering face-piece respirator.

FIG. 15 is a schematic perspective view of one embodiment of a method 800 of making a filtering face-piece respirator that includes an exhalation valve. Although described in reference to the filtering face-piece respirator 200 of FIGS. 6-9, the method 800 can be utilized to form any suitable filtering face-piece respirator that includes an exhalation valve. The method 800 includes providing a mask body blank 213 at 802. The mask body blank 213 can include any suitable material or combination of materials. The method 800 further includes forming the mask body 212 from the mask body blank 213 at 804. An opening or aperture 201 can be formed in the mask body 212 using any suitable technique or combination of techniques, e.g., the opening can be formed by die cutting. At 806, the mask body fold line 222 can be formed using any suitable technique or combination of techniques. As illustrated, the mask body fold line 222 is formed by folding the mask body 212 such that the mask body fold line separates the mask body 212 into the first portion 218 and the second portion 220. The first and second portions 218 and 220 can be adapted to rotate about the mask body fold line 222. Further, in one or more embodiments, the opening 201 can be formed in the central region 202 of the mask body 212 prior to forming the mask body full line 222, where the mask body fold line intersects the opening 201.

At 806, additional functionality can be provided to the respirator 200, e.g., additional weld lines can be formed in the mask body 212, and a harness can be connected to the mask body. In one or more embodiments, the harness can be attached to the mask body 212 by attaching one or more straps of the harness to the support element 576 as described in reference to respirator 500 of FIG. 12.

At 808, the mask body 212 can be opened such that the mask body is in a cup-shaped configuration using any suitable technique or combination of techniques. At 810, the exhalation valve 270 can be connected to the mask body 212 such that it is disposed in the central region 202 over the fold line 222 and such that the support element is connected to the base 272 of the exhalation valve and extends from the perimeter of the base and is in contact with the mask body 212. The exhalation valve 270 can be connected to the mask body 212 using any suitable technique or combination of techniques. In one or more embodiments, the exhalation valve 270 can be connected to the central region 202 of the mask body 212 by disposing the exhalation valve over the opening 201 such that the exhalation valve substantially covers the opening. In one or more embodiments, the exhalation valve 270 completely covers the opening 201.

EXAMPLE

A circular hole for receiving an exhalation valve was punched through the fold in the central panel and at a junction of four weld line patterns of a commercial flat fold filtering face respirator available under the trade designation VFLEX from 3M Company, USA. The exhalation valve (CPC valve available from 3M Company) was welded onto the mask body by ultrasonic welding. The mask showed a decreased breathing resistance compared to the same mask without an exhalation valve. The mask with the valve was compared with a mask prepared in the same way except that the exhalation valve was placed above or below the central pleat and subjected to a test panel consisting of 25 adults. A significant majority of the panel (15 out of 25 individuals) ranked the mask with the valve on the pleat as the most comfortable.

What is claimed:

1. A foldable filtering face-piece respirator, comprising:
- a mask body comprising filter media disposed between an inner cover web and an outer cover web, the mask body comprising a first portion and second portion separated by a line of demarcation, wherein the line of demarcation comprises a mask body fold line;
- a harness connected to the mask body;
- a structural pattern in a central panel of the mask body above and below the line of demarcation;
- an exhalation valve disposed at a location centrally on the line of demarcation and in an opening in a central region of the mask body such that the mask body fold line intersects the opening and the exhalation valve extends both above and below the line of demarcation, wherein the exhalation valve is positioned within the structural pattern, and wherein the exhalation valve comprises a base and a cover attached to the base;
- a support element connected to the base of the exhalation valve and extending from an outer perimeter of the base, wherein the support element completely surrounds an entirety of the outer perimeter of the base of the exhalation valve, wherein the support element is in contact with the mask body when the mask body is in a cup-shaped configuration, wherein one of:
- (i) the support element is disposed between the filter media and the inner cover web;
- (ii) the support element is disposed between the filter media and the outer cover web; or
- (iii) the support element is disposed on an inner surface of the inner cover web;
- wherein the line of demarcation is discontinuous at the location of the exhalation valve.

2. The respirator of claim 1, wherein the respirator comprises a second support element connected to the base of the exhalation valve and extending from the perimeter of the base, wherein the support element extends in a first direction from the perimeter of the base and the second support element extends in a second direction from the perimeter of the base.

3. The respirator of claim 2, wherein the second support element is pivotably attached to the base.

4. The respirator of claim 1, wherein the structural pattern comprises a truss-type geometry including a larger triangle that has rounded corners and including a pair of smaller triangles located within the larger triangle, wherein each of the pair of smaller triangles is nested within the larger triangle such that two sides of each of the pair of smaller triangles also form a partial side of the larger triangle.

5. The respirator of claim 4, wherein the structural pattern is comprised of a first pattern of weld lines and a second pattern of weld lines, and the first and second pattern of weld lines do not traverse the line of demarcation.

6. The respirator of claim 1, wherein the line of demarcation extends transversely across the mask body, wherein the first portion comprises an upper portion of the mask body and the second portion comprises a lower portion of the mask body.

7. The respirator of claim 1, wherein the support element comprises an air permeable support element.

8. The respirator of claim 1, wherein the support element comprises one or more air channels adapted to direct air incident on the support element through the mask body.

9. The respirator of claim 1, wherein a portion of the support element is disposed between the mask body and a tab connected to a perimeter of the mask body.

10. The respirator of claim 1, wherein the harness is connected to the support member.

11. The respirator of claim 1, wherein the structural pattern is made from a series of weld lines.

12. A method of making a filtering face-piece respirator, comprising:
- forming a mask body comprising filter media disposed between an inner cover web and an outer cover web, the mask body comprising;
- forming a demarcation line in the mask body that separates the mask body into a first portion and a second portion, and a central portion between the first portion and the second portion, the demarcation line comprising a mask body fold line, wherein the first and second portions are adapted to rotate about the mask body fold line;
- forming weld lines on the mask body, wherein the weld lines form a structural pattern of weld lines in the central portion of the mask body, and wherein the structural pattern is above and below the line of demarcation; and connecting an exhalation valve to an opening in a central region of the mask body, placed at a location centrally over the mask body fold line such that the mask body fold line intersects the opening and the exhalation valve extends both above and below the line of demarcation, wherein the exhalation valve is positioned within the structural pattern of weld lines, wherein the demarcation line is discontinuous at the location of the exhalation valve;

wherein a support element is connected to a base of the exhalation valve and extends from an outer perimeter of the base, wherein the support element completely surrounds an entirety of the outer perimeter of the base of the exhalation valve, and wherein the support element is in contact with the mask body, wherein one of:

(iv) the support element is disposed between the filter media and the inner cover web;

(v) the support element is disposed between the filter media and the outer cover web; or (vi) the support element is disposed on an inner surface of the inner cover web.

13. The method of claim 12, further comprising forming the opening in the central region of the mask body prior to connecting the exhalation valve to the central region of the mask body, wherein connecting the exhalation valve comprises disposing the exhalation valve over the opening such that the exhalation valve covers the opening.

14. The method of claim 13, wherein the opening in the central region of the mask body is formed prior to forming the mask body fold line.

15. The method of claim 12, wherein forming the mask body fold line comprises folding the mask body.

16. The method of claim 15, further comprising unfolding the mask body prior to connecting the exhalation valve to the central region of the mask body over the mask body fold line.

17. The method of claim 12, further comprising attaching a harness to the mask body.

18. The method of claim 17, wherein attaching the harness to the mask body comprises attaching the harness to the support element.

19. The method of claim 12, wherein the structural pattern is comprised of a first pattern of weld lines and a second pattern of weld lines, and the first and second pattern of weld lines do not traverse the line of demarcation.

20. The method of claim 12, wherein the structural pattern comprises a truss-type geometry including a larger triangle that has rounded corners and including a pair of smaller triangles located within the larger triangle, wherein each of the pair of smaller triangles is nested within the larger triangle such that two sides of each of the pair of smaller triangles also form a partial side of the larger triangle.

* * * * *